US012202088B2

(12) United States Patent
Thanh Nguyen

(10) Patent No.: US 12,202,088 B2
(45) Date of Patent: Jan. 21, 2025

(54) OMNI-DIRECTIONAL COMPUTERIZED NUMERICAL CONTROL (CNC) MACHINE TOOL AND METHOD OF PERFORMING THE SAME

(71) Applicant: Hoai Thanh Nguyen, Ho Chi Minh (VN)

(72) Inventor: Hoai Thanh Nguyen, Ho Chi Minh (VN)

(*) Notice: Subject to any disclaimer, the term of this patent is extended or adjusted under 35 U.S.C. 154(b) by 399 days.

(21) Appl. No.: 17/305,053

(22) Filed: Jun. 29, 2021

(65) Prior Publication Data
US 2021/0405607 A1 Dec. 30, 2021

(51) Int. Cl.
*B23Q 1/52* (2006.01)
*B23Q 3/06* (2006.01)

(52) U.S. Cl.
CPC ............ *B23Q 1/527* (2013.01); *B23Q 3/064* (2013.01); *B23B 2231/30* (2013.01); *B23Q 2240/007* (2013.01); *Y10T 29/5107* (2015.01)

(58) Field of Classification Search
CPC . Y10T 29/5109; Y10T 29/5114; B23Q 1/527; B23Q 3/06; B23Q 3/064; B23Q 3/066; B23Q 3/067; B23Q 3/106; B23Q 3/107; B23Q 3/108; B23Q 2240/007; B23B 2231/30; B25B 5/02
USPC .... 29/26 A, 27 C, 27 R; 269/55, 71, 73, 291
See application file for complete search history.

(56) References Cited

U.S. PATENT DOCUMENTS

| | | | | |
|---|---|---|---|---|
| 3,868,101 A * | 2/1975 | Nozaki | ............. | B23K 37/0452 414/766 |
| 4,026,536 A * | 5/1977 | Netto | ...................... | F16C 41/02 269/73 |
| 5,904,347 A * | 5/1999 | Lin | .................... | B23K 37/0452 269/69 |
| 9,440,274 B2 * | 9/2016 | Mitze | .................... | B21D 43/10 |
| 2002/0078541 A1 * | 6/2002 | Ohmori | ................... | B24B 19/08 29/563 |
| 2006/0163317 A1 * | 7/2006 | Wirth | .................... | B23Q 1/527 228/32 |
| 2007/0199187 A1 * | 8/2007 | Ohmori | .................. | B23Q 7/042 409/165 |
| 2011/0272872 A1 * | 11/2011 | Stadtfeld | ................. | B23Q 3/00 269/61 |
| 2012/0205360 A1 * | 8/2012 | Fitzpatrick | ........... | B23B 41/003 219/137 R |
| 2018/0029143 A1 * | 2/2018 | Cavezzale | ............... | B23C 1/002 |
| 2019/0202011 A1 * | 7/2019 | Watkins | ............... | B23K 37/047 |

FOREIGN PATENT DOCUMENTS

WO WO-2008096389 A2 * 8/2008 ............ B23Q 1/488

* cited by examiner

*Primary Examiner* — Sunil K Singh
*Assistant Examiner* — Michael Vitale

(57) ABSTRACT

A computer numerical control (CNC) machining apparatus and method are disclosed which comprise: a first base; a second base vertically perpendicular to the first base; a tool head support assembly having a tool head, connected to and move a tool head in an omni-directional; and a plurality of rotatable clamps configured to independently hold, release, and move a workpiece along the first base and independently rotate a workpiece 360° around itself.

20 Claims, 15 Drawing Sheets

OMNI-DIRECTIONAL COMPUTERIZED NUMERICAL CONTROL (CNC) MACHINE TOOL AND METHOD OF PERFORMING THE SAME

CLAIM OF PRIORITY

This application claims priority under 35 U.S.C. § 102(d) of an application No. 1-2020-03813, filed on Jun. 30, 2020, in the Republic Socialist of Vietnam, entitled, "Máy gia công điều khiển số (CNC) đa hướng vá phương pháp gia công dựa trên máy này". The patent application identified above is incorporated here by reference in its entirety.

FIELD OF THE INVENTION

The present invention relates generally to the field of computerized numerical controlled (CNC) machine tools. More specifically, the present invention relates to an omni-directional CNC machine tool that can rotate continually at an infinitesimal amount and work on any circumferential (rounded) surfaces and at any length.

BACKGROUND ART

Today computerized numeric controlled (CNC) machine tools armed with smart software systems and automated processes have become ubiquitous in the industrial sector. These machine tools have greatly reduced the traditionally tedious and backbreaking works for carpenters in making multiple and identical parts. In addition, new technologies and higher degrees of precision and automation have also allowed increasingly sophisticated equipment and components to be manufactured with ease. When a limited series of workpieces must be machined, i.e., when limited batches of identical workpiece clamping members are required, resulting in a high incidence of skilled workers and extensive machine downtime, both factors resulting in an increase in machining costs and therefore in the cost of the finished workpiece.

There are many commercially available versions of CNC machine tools. However, all of them are cumbersome and expensive. The prior-art CNC machine tools are cumbersome because the tool heads have to either (a) lower/rotate themselves to work on the bottom side of the workpiece or (b) the arms that hold the workpiece have to lift the workpiece up higher than the tool head. In addition, in the prior-art CNC machine tools, the arms hold the workpiece in a plane perpendicular to the base or the working bench. In this configuration, if the workpiece is long, the working head cannot reach to either the left and right distal ends of the workpiece. As exemplary illustrations to prior-art structures, Bacci et al. disclose various structures of CNC machine tools.

In the European patent application No. E.P. 2979811, entitled, "Multi-Spindle Working Head and Machine Tool Using Said Head" by Bacci et al. (hereinafter referred to as "Bacci's 811 application") disclose a multi spindle working head including a support rotating around a first numerically controlled rotary axis; on a first side of the support, a first spindle group rotating around a second numerically controlled rotary axis; on a second side of the support, a second spindle group rotation around a third numerically controlled rotary axis. In the Bacci's 811 application, the support rotates around the first axis C (see FIG. 6 of the Baccci's 811 application) to bring the first spindle group 14 underneath workpiece P. Obviously, the CNC with multi-spindle working head disclosed by the Bacci's 811 application is complex, expensive, and has limited applications because it requires multiple spindle groups and can only work on short workpieces P. This design cannot reach the distal ends of long workpieces.

In another European patent application No. EP0873817B1, entitled "Machine Tool for Machining Long Workpieces" also by Bacci (hereinafter referred to as "Bacci's 817 patent application"), a CNC 100, as shown in FIG. 1 having a multiple machining heads, is designed to work on a long workpiece P1 in consecutive machining cycles. In this configuration, workpiece P1—arranged on the same plane and perpendicular to base 1—is moved back and forth along the Z axis. The machining head is rotated around the axis B and axis C to work on three sides of workpiece P1 except the bottom side. See column 4, paragraph ¶[0021] of the Bacci's 817 patent application. In another arrangement in FIG. 5 (not shown) of the Bacci's 817 patent application, the workpiece P3 is held at the right angle with axis Z and parallel to base 1. The loading and unloading cycles are disclosed to imply that workpiece P has to be unloaded in order to be loaded in different positions to be worked on. This prior art CNC machine tool disclosed by Bacci's 817 patent application is silent regarding working on the bottom side of workpiece P. In addition, the workpiece P1 has to be unloaded in one arrangement (parallel to the Z-axis) and loaded again to achieve another arrangement (perpendicular to the Z-axis).

Next referring to FIG. 2 (FIG. 8 of the Bacci's 263 patent application) of the present disclosure, another prior-art CNC version is disclosed. In the PCT patent application No. WO-2008/004263 entitled, "Machining Centre with Positioning System of the Workpiece Clamping Members" also by Bacci et al. (hereinafter referred to as "the Bacci's 263 patent application"), Bacci et al. disclose a modified embodiment of a machining centre that includes a series of clamping members 19 opposed and mounted on an element or support 15X rotating or oscillating about a horizontal axis F, substantially to the X axis and supported by the support 115. To adjust the position of each clamping member 19 with respect to the support or element 15X and to the support 115 it is possible to rotate through +/−90° with respect to the position shown in FIG. 2 to place one or other of the groups of clamping members 19 in the same position as in the clamping members 19 in FIG. 4 (of the Bacci's 263 patent application) with respect to the upright 103 and to the temporary constraining element 23, i.e., with the seat 25 oriented towards the latter. In this position it is possible to perform adjustment of the respective clamping members 19 along the axis X with the procedure described above. With this configuration, the prior-art Bacci's 263 patent application, the clamping members 19 have to move simultaneously and dependent on one another. The rotating or oscillating of clamping members 19 forces the tool heads 9 to adjust their positions. In addition, the clamping members 19 only click at +/−90° interval, flipping at +/−90° step every time the clamping members 19 changes the position. The prior-art Bacci's 263 patent application does not teach a continuous rotation of the workpiece. This results in the lack of precision when the workpiece needs to be worked on exact locations on its sides.

FIG. 2A shows another aspect of the Bacci's 263 patent application beside the rotation or oscillation of the clamping members 19, which illustrates a top view 200A of the Bacci's machine centre. In this aspect, it is clear from FIG. 2A (FIG. 1 of the Bacci's 263 patent application) tool head 9 is moved translationally in the Y and Z-axis along the tracks 5 and 7A respectively. In addition, tool head or machining head 9 is rotated around the A direction. Clamping members 19A is moved translationally in and out of the plane of the paper and perpendicular to gantry 1, carrying workpiece P with them so that tool head 9 can select an appropriate tool to work. It is not difficult to see that CNC machine 200A of Bacci has more parts to program or control, i.e., tool head 9 with three degree of controlling, workpiece P with two degrees of controlling (rotation and translation). Additionally, this CNC machine 200A of Bacci has two clamping members 19A so that the complexity of controlling is doubled.

Therefore what is needed is a CNC machining tool that is simple in design, easy to control, cost-effective, and capable of working on all sides of the workpiece.

In addition, what is needed is a CNC machining tool that can work with workpieces of any lengths.

The CNC machining apparatus of the present invention meets the above needs and solves the above problems.

SUMMARY OF THE INVENTION

Accordingly, an object of the present invention is to provide a computer numerical control (CNC) machining apparatus which comprises: a first base; a second base is structured and connected so as to allow the first base to move translationally through the second base; a tool head support assembly connected to and move a tool head in an omni-directional; and a plurality of rotatable clamps configured to independently hold, release, and translationally move a workpiece along the first base and independently rotate a workpiece 360° around itself.

Another object of the present invention is to provide a method of machining a workpiece using a CNC machining apparatus which comprises: independently holding, releasing, translating, and rotating a workpiece 360° around itself to any side, any length, and any locations where the specification requires; all movements are numerically controlled by the CNC machining apparatus without the need of reloading the workpiece.

Another object of the present invention is to provide a plurality of rotatable clamps that are configured to holding, releasing, translating, and rotating a workpiece 360° around itself to any side, any length, and any locations where the specification requires.

Yet another object of the present invention is to provide a CNC machining tool which includes a tool head which can move and rotate independently in omni-directional and is designed such that different tools such as an electric saw is inclusive.

Yet another object of the present invention is to provide a CNC machining apparatus that is precise in operation, simple in hardware and software designs, requiring less parts and less software controls and yet capable of operating on all surfaces of the workpiece without reloading.

These and other advantages of the present invention will no doubt become obvious to those of ordinary skill in the art after having read the following detailed description of the preferred embodiments, which are illustrated in the various drawing and figures.

BRIEF DESCRIPTION OF THE DRAWINGS

The accompanying drawings, which are incorporated in and form a part of this specification, illustrate embodiments of the invention and, together with the description, serve to explain the principles of the invention.

Figure 1:
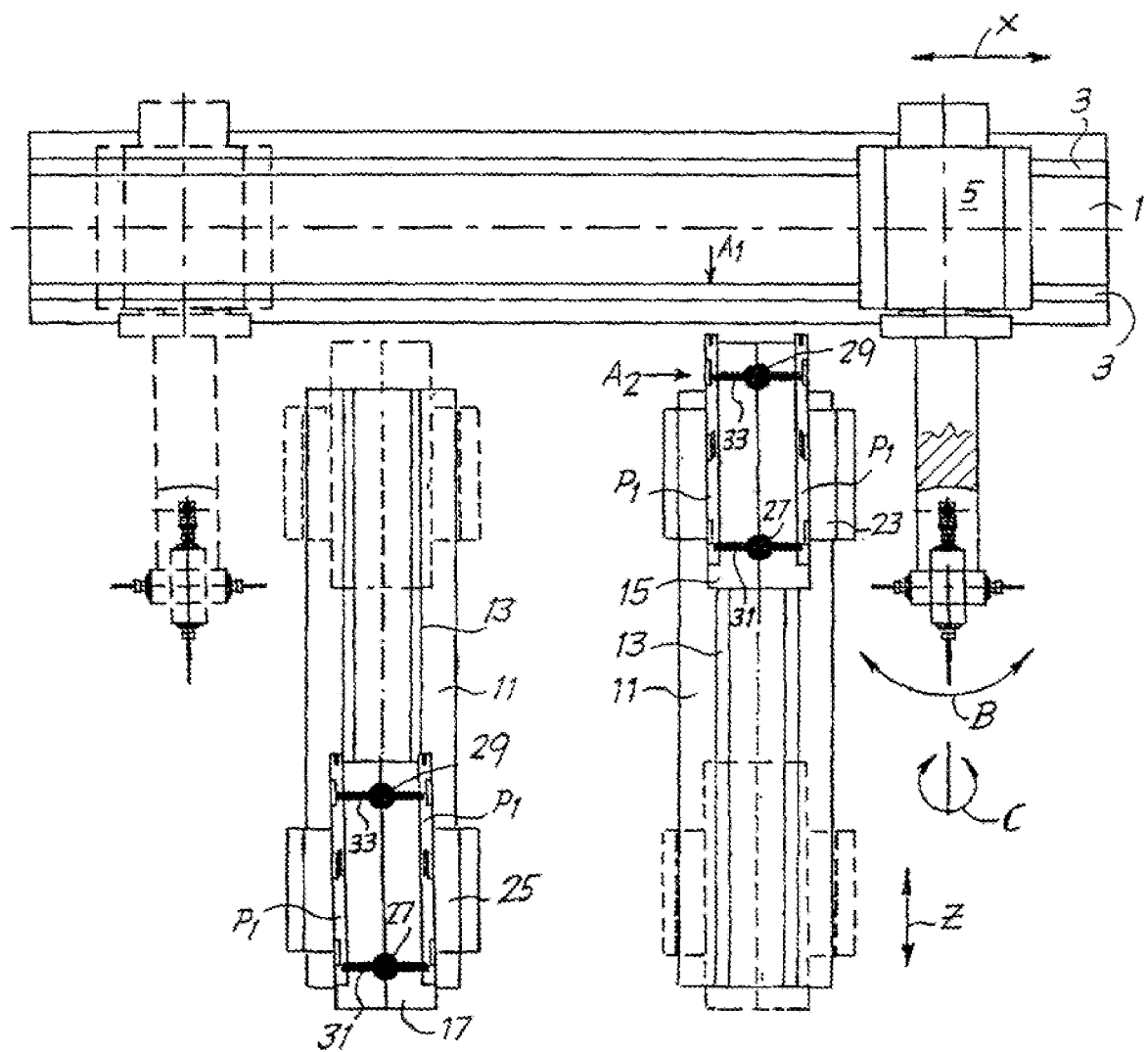
FIG. 1 is a prior-art CNC apparatus (the Bacci's 171 patent application) whose clamping devices cannot be independently control and rotate around itself.
Figure 2:
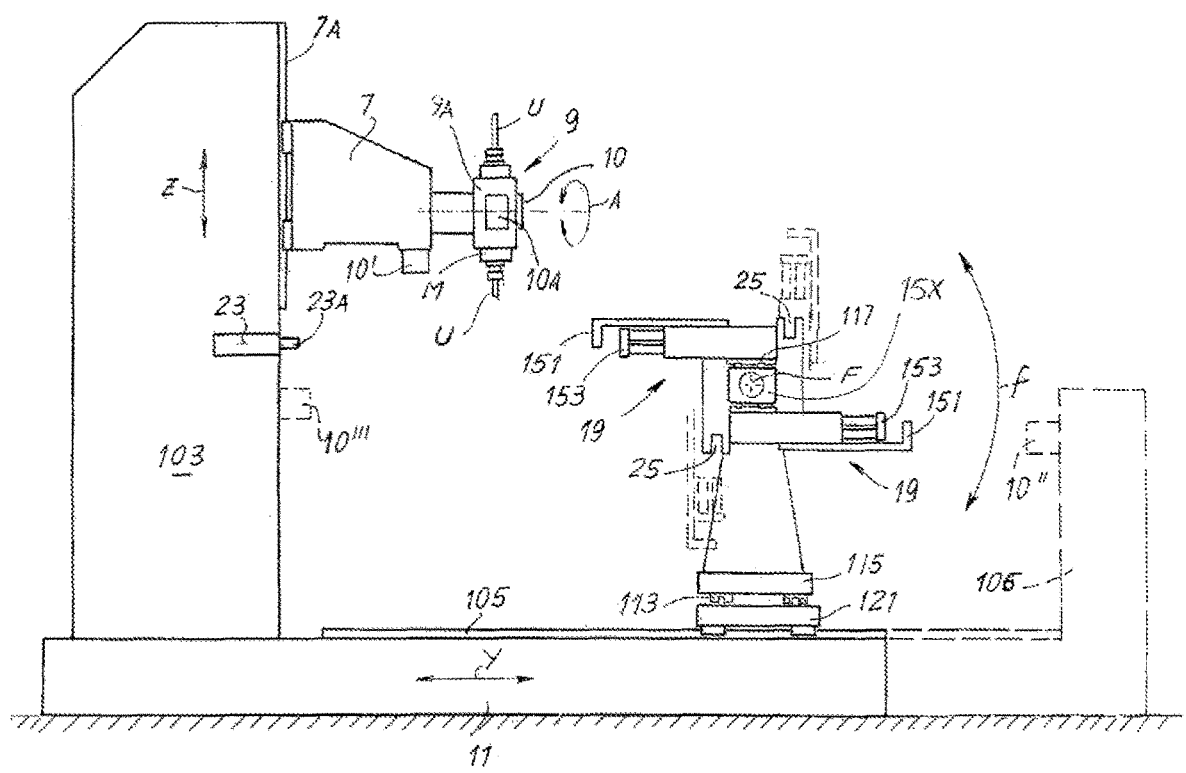
FIG. 2 is another prior-art CNC apparatus (the Bacci's 263 patent application) where the workpiece holder can flip in +/−90° non-continuous steps to turn the workpiece to its sides.
Figure 2A:
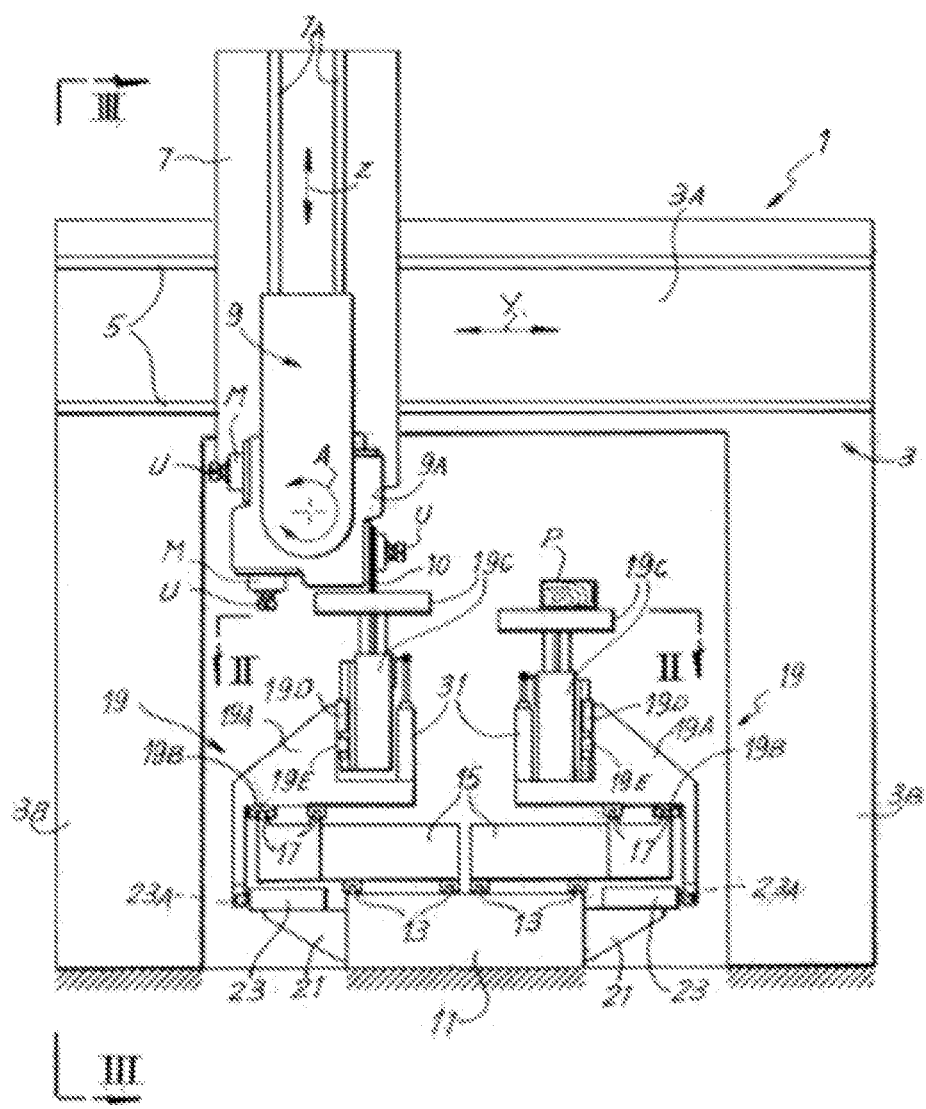
FIG. 2A shows a different aspect of the Bacci's 263 CNC's apparatus illustrating its complexity and limitations.

The figures depict various embodiments of the technology for the purposes of illustration only. A person of ordinary skill in the art will readily recognize from the following discussion that alternative embodiments of the structures and methods illustrated herein may be employed without departing from the principles of the technology described herein.

DETAILED DESCRIPTION OF THE INVENTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well-known methods, procedures, components, and circuits have not been described in detail so as not to unnecessarily obscure aspects of the present invention.

Within the scope of the present description, the reference to "an embodiment" or "the embodiment" or "some embodiments" means that a particular feature, structure or element described with reference to an embodiment is comprised in at least one embodiment of the described object. The sentences "in an embodiment" or "in the embodiment" or "in some embodiments" in the description do not therefore necessarily refer to the same embodiment or embodiments. The particular feature, structures or elements can be furthermore combined in any adequate way in one or more embodiments.

Within the scope of the present description, the word "omni-directional" means all directions of a spherical coordinate covering the same space of the Cartesian XYZ coordinates system 399. The X-axis and Z-axis translational (or linear) movements, the rotational Y-axis and Z-axis of the head tool assembly; the Y-axis translational movements, and the rotation 360° around the Y-axis enable CNC machining apparatus 300 to approach from any angle and operate precisely at any location regardless of the proximity of these points on workpiece 321.

Within the scope of the present description, the words "connected", "connecting", "coupled", "coupling", "connections", "coupled", "bolted", "laid", "positioned", "attached", "attaching", "affixed", "affixing" are used to mean attaching between two described members using screws, nails, tongs, prongs, clips, spikes, staples, pins, male and female nuts, buttons, sleeves, lugs, cams, handles, bars, fasteners, connectors, or the likes.

Within the scope of the present description, the words "connected", "connecting", "coupled", "coupling", "connections", "coupled" are used to mean wired and/or wireless connections. Wired connections include electrically conducting wires, cables, lines, coaxial cables, strips, or the likes. Conducting wires are made of conductors such as coppers, aluminum, gold, or the likes. Wireless connections include electromagnetic waves, short range communication channels include ZigBee™/IEEE 802.15.4, Bluetooth™, Z-wave, NFC, Wi-fi/802.11, cellular (e.g., GSM, GPRS, WCDMA, HSPA, and LTE, 5G, etc.), IEEE 802.15.4, IEEE 802.22, ISA100a, wireless USB, and Infrared (IR), LoRa devices, etc. Medium range wireless communication channels in this embodiment of communication link 161 include Wi-fi and Hotspot. Long range wireless communication channels include UHF/VHF radio frequencies.

Within the scope of the present description, the word "network" includes data center, cloud network, or network such as nano network, body area network (BAN), personal area network (PAN), local area network (LAN), campus/corporate area network (CAN), metropolitan area network (MAN), wide area network (WAN), and mesh area networks, or any combinations thereof.

Within the scope of the present description, the word "rotation", "rotating", "rotate" includes clockwise and/or counterclockwise direction.

Within the scope of the present invention, the Cartesian XYZ coordinate (x, y, z) also includes equivalent spherical coordinate (r, $\ominus$, $\Phi$), and/or cylindrical coordinate (r, $\ominus$, $\Phi$) that can determine the direction of movement or coordinate of a point of any members of CNC machining apparatus.

Figure 3:
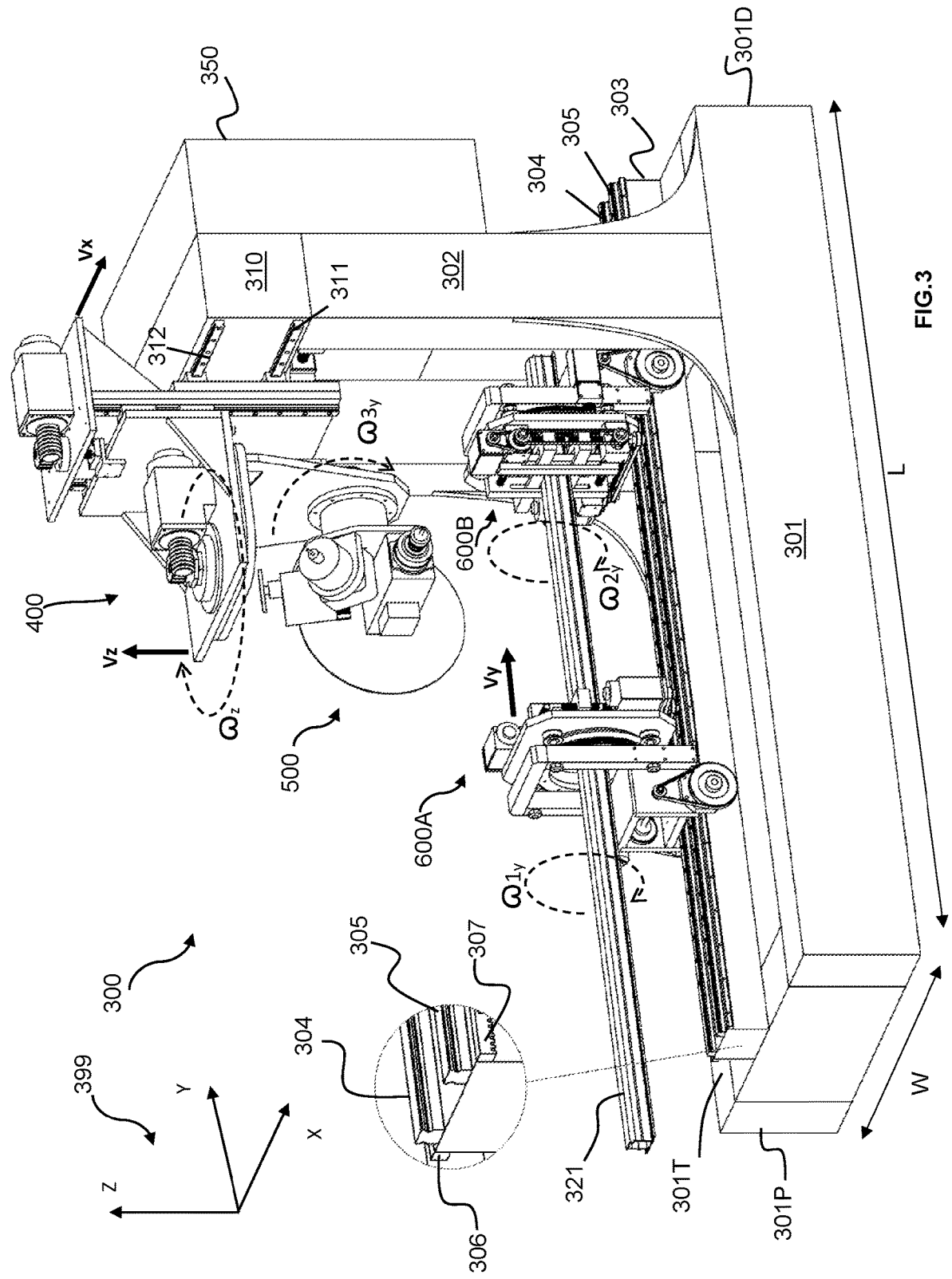
FIG. 3 is a three-dimensional (3D) diagram of the computer numerical control (CNC) machining apparatus where the clamping devices can be independently controlled and rotated continuously 360° at any infinitesimal step in accordance with an embodiment of the present invention.

Referring now to the drawings and specifically to FIG. 3, a three-dimension (3D) diagram of a computer numerical control (CNC) machining apparatus 300 in accordance with an exemplary embodiment of the present invention is illustrated. CNC machining apparatus 300 includes a first base 301 spanning along a Y-axis of a XYZ Cartesian coordinate 399. First base 301, of length L and width W, includes a proximate end 301P and a distal end 301D. On a top surface 301T of first base 301, a second base 302 is firmly erected along a Z-axis near distal end 301D. In advantageous embodiments, second base 302 is shaped like an upside down U gantry which allows first base 301 to go under it. The legs of the upside down U gantry spans on the two edges of first base 301. On top surface 301T, a workpiece rail support base 303 is deposited substantially at the center of first base 301 and ran along length L in the Y-axis. A pair of a first workpiece rail 304 and a second workpiece rail 305 are spun along the edges of workpiece rail support base 303. Along the sides of workpiece rail support base 303, a first lateral track 306 and a second lateral track 307 are deposited. The function of first and second lateral tracks 306 and 307 will be seen later. On top of second base 302, an X-axis tool head support 310 is attached. On both sides of X-axis tool head support 310 along the X-axis, a first X-axis tool head rail 311 and a second X-axis tool head rail 312 substantially parallel to first X-axis tool head rail 311 are laid. A CNC controller box 350 is affixed to the back side of second base 302 and X-axis tool head support 310. CNC controller box 350 contains important electrical hardware and software that numerically control the entire operation of CNC machining apparatus 300.

Referring again to FIG. 3, a tool head support assembly 400 is movably connected to X-axis tool head support 310. Tool head support assembly 400 carries a tool head (machining) unit 500. In many aspects of the present invention, tool head support assembly 400 is designed to move in an omni-directional. In the present disclosure, the omni-directional is defined to include 360° continuous rotations around Z-axis and Y-axis and translational movements along the X-axis and the Z-axis of XYZ Cartesian coordinate 399. Tool head unit 500 contains various tools that are replaceable for different machining jobs. That is, these tools can be substituted with other tools as required by the design specification. In some advantageous embodiments, different tool heads can be stored and retrieved from a base like a Swiss knife. In some other embodiments of the present invention, an electric saw is one of the tools so that a workpiece can be cut at any angle, at any side, and at any length by virtue of the omni-directional movements of tool head unit 500 described above.

Continuing with FIG. 3, a first rotatable clamp 600A and a second rotatable clamp 600B are coupled to slide on first workpiece rail 304 and second workpiece rail 305. Structurally, first rotatable clamp 600A and second rotatable clamp 600B are the same but they are arranged in a reverse direction to each other. That is, the back of first rotatable clamp 600A is set first near proximate end 301P, while that of second rotatable clamp 600B is disposed near distal end 301D, resulting in the balance and stability for a workpiece 321. In operation, first rotatable clamp 600A and second rotatable clamp 600B operate and rotate independently. More particularly, first rotatable clamp 600A can hold and move workpiece 321 along first and second workpiece rails 304 and 305 while second rotatable clamp 600B is in a release state. In many advantageous embodiments of the present invention, first rotatable clamp 600A and second rotatable clamp 600B include a four-directional square clamp configured to always hold workpiece 321 at its center of gravity. In addition, both first and second rotatable clamps 600A and 600B are designed to rotate continuously 360° around the Y-axis independently. It is noted that the use of more than two workpiece clamps is still within the scope of the present invention. Tool head support assembly 400, tool head unit 500, first rotatable clamp 600A, and second rotatable clamp 600B will be described in details in the following FIGS.

Figure 4:
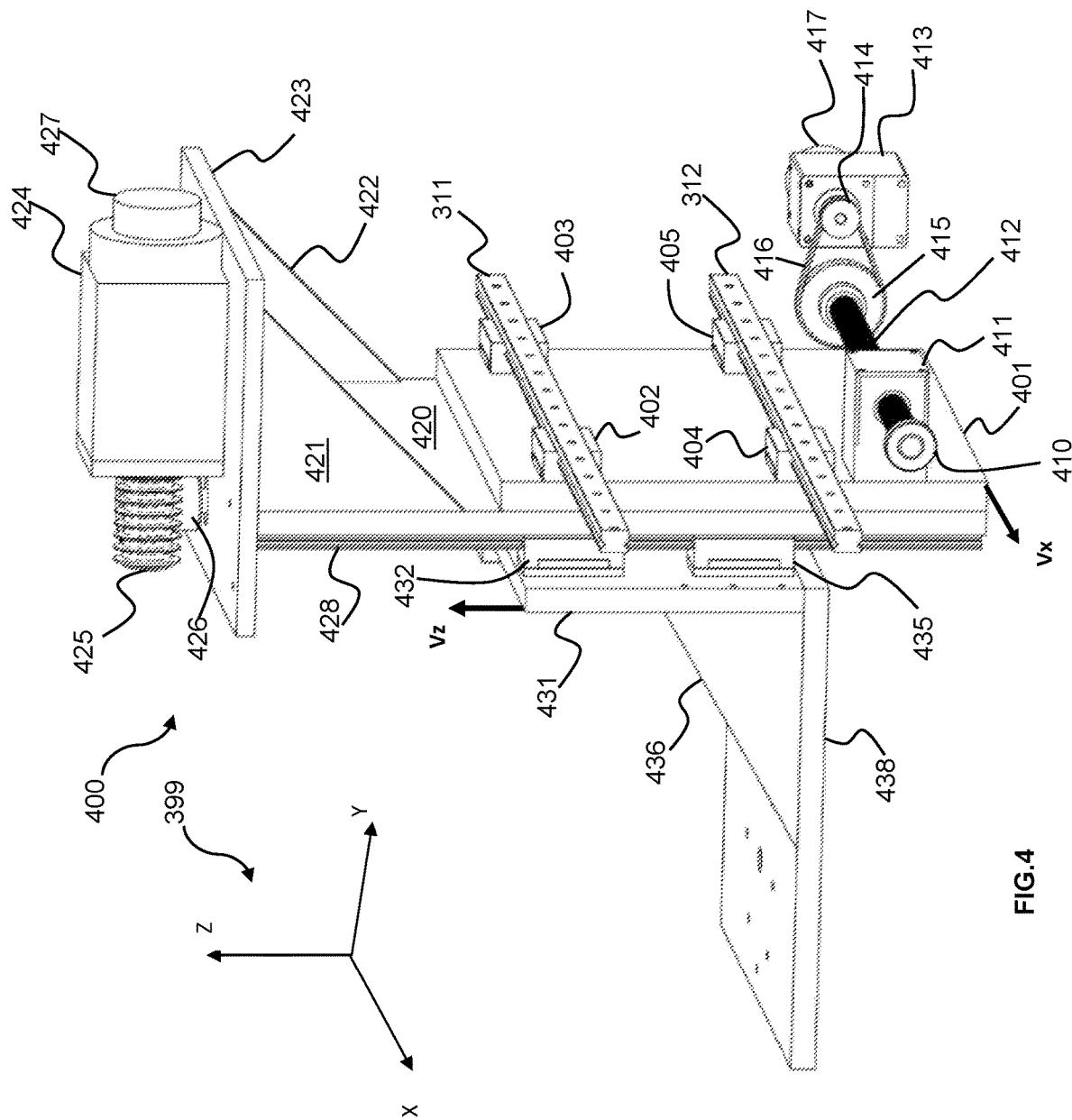
FIG. 4 is a 3D diagram illustrating the internal structure of the tool head support assembly that enables the tool head to move in an omni-directional in accordance with an embodiment of the present invention.
Figure 4A:
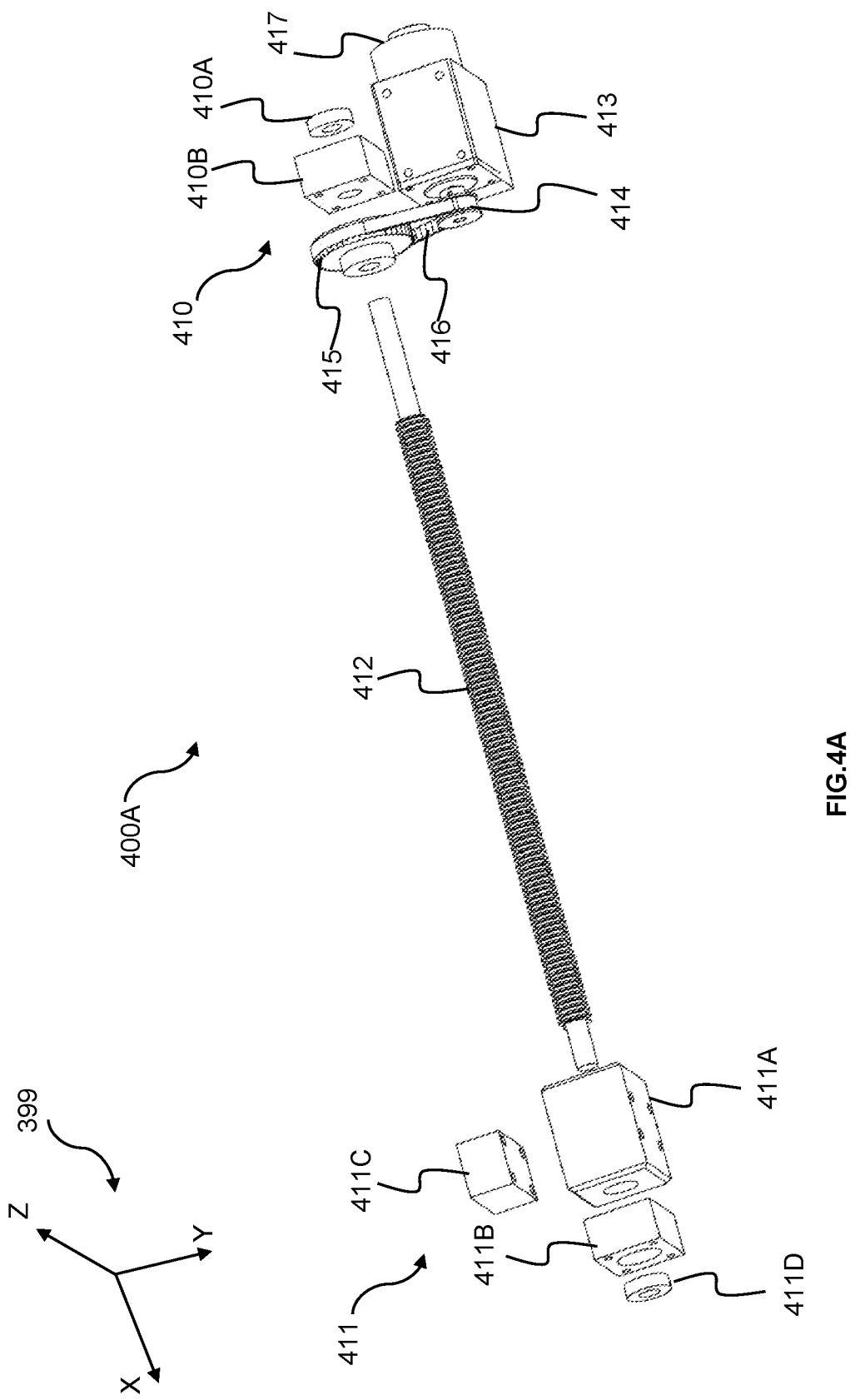
FIG. 4A is a 3D diagram illustrating the assembling components of the X-axis ball screw and the motor that enable the tool head to rotate continuously in an omni-directional in accordance with an embodiment of the present invention.
Figure 4B:
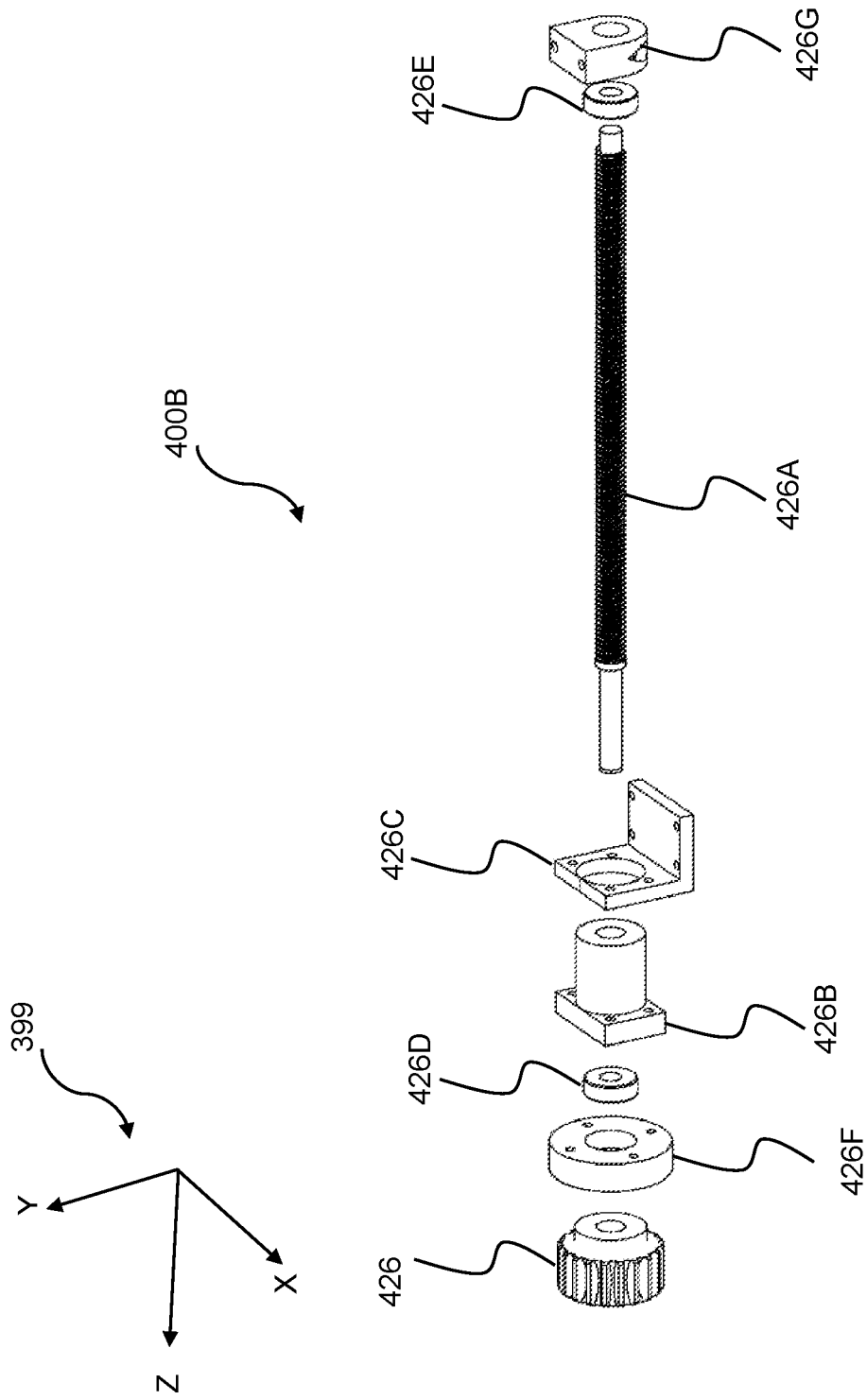
FIG. 4B is a 3D diagram illustrating the assembling components of the Z-axis driven gear and the motor that enable the tool head to rotate continuously in an omni-directional in accordance with an embodiment of the present invention.

Now referring to FIG. 4, a 3D diagram of the internal structure of tool head support assembly 400 enabling tool head unit 500 to move in an omni-directional in accordance with an exemplary embodiment of the present invention is illustrated. FIG. 4, FIG. 4A, and FIG. 4B demonstrate that tool head support assembly 400 is configured to move in the omni-directional as defined above in FIG. 3. To begin with, tool head support assembly 400 includes a first X-axis sliding board 401 with a first X-axis slider 402, a second X-axis slider 403, a third X-axis slider 404, and a fourth X-axis slider 405. These first to fourth X-axis sliders 402-405 are attached on the back side of X-axis sliding board 401. First X-axis tool head rail 311 and second X-axis tool head rail 312 are coupled to first to fourth X-axis sliders 402-405. As such, first X-axis sliding board 401 can slide along the X-axis by means of an X-axis tool head moving assembly 400A.

Continuing with FIG. 4, a Z-axis rail support board 420 is fastened on the front side of tool head support assembly 400. A first Z-axis rail 428 and a second Z-axis rail 429 (not shown in FIG. 4) are deposited along the edges of Z-axis rail support board 420. A first Z-axis slider 432, a second Z-axis slider 433 (not shown in FIG. 4), a third Z-axis slider 434 (not shown in FIG. 4), and a fourth Z-axis slider 435 are coupled to first and second Z-axis rails 428 and 429 respectively so that Z-axis rail support board 420 moves up and down in the Z-axis, contributing to the omni-directional of tool head support assembly 400. This Z-axis translational movement is realized by a Z-axis rotor support board 423 connected to the top of Z-axis rail support board 420 and secured by a first X-axis triangular support bracket 421 and a second X-axis triangular support bracket 422. A Z-axis rotor 424 is laid on top of Z-axis rotor support board 423. Z-axis rotor 424 includes a Z-axis driving gear 425 coupled to drive a Z-axis driven gear 426. A screwed handle is connected to a Z-axis sliding board 431 at one end and Z-axis driven gear 426 at the other end. Four Z-axis sliders 432-435 connects Z-axis sliding board 431 to slide on first and second Z-axis rails 428 and 429 respectively. A Z-axis sensor 427 is used to sense the velocity $V_z$ and the location of tool head unit 500. A first horizontal tool head support board 438 is connected at a right angle to Z-axis sliding board 431 and secured by a first Z-axis triangular support bracket and a 436 and second Z-axis triangular support bracket 437. The translational movements in X-axis and Z-axis of tool head support assembly 400 as described above and in FIG. 3 are facilitated by X-axis tool head moving assembly 400A and Z-axis moving unit 400B which are described next.

Now referring to FIG. 4A, a 3D perspective diagram of X-axis tool head moving assembly 400A in accordance with an exemplary embodiment of the present invention is illustrated. X-axis tool head moving assembly 400A includes an X-axis moving end 410 and an X-axis fixed end 411. An X-axis ball screw 412 links and imparts rotation from X-axis moving end 410 to X-axis fixed end 411. X-axis moving end 410 includes, an X-axis sensor 417 coupled to drive an X-axis rotor 413 using an X-axis driving pulley 414 which, in turn, is coupled to an X-axis driven pulley 415 and X-axis pulley belt 416. This X-axis driven pulley 415 is again coupled an X-axis moving side ball nut housing 410B and an X-axis lock screw (stopper) 410A. In the driven assembly, a fixed side ball nut housing 411A is coupled to a fixed side support unit 411B which is, in turn, coupled to a second fixed side support unit 411C, and a X-axis lock screw (stopper) 411D. When X-axis rotor 413 is turned on, it imparts a translational movement of X-axis sliding board 401 at a velocity $V_x$ along the X-axis of XYZ Cartesian coordinate 399. X-axis sensor 417 records the positions and velocity $V_x$ of X-axis sliding board 401.

Next, referring to FIG. 4B, a perspective 3D diagram of Z-axis moving unit 400B in accordance with an exemplary embodiment of the present invention is illustrated. Starting from first base 301 to Z axis rotor support board 423, Z-axis moving unit 400B includes an Z-axis end bearing support 426G, a Z-axis first shaft coupler 426E, a Z-axis ball screw 426A, a Z-axis bracket 426C, a Z-axis flanged nut 426B, a Z-axis second shaft coupler 426D, a Z-axis ball housing 426F, and Z-axis driven gear coupled to Z-axis driving gear 425. In one embodiment of the present invention, the mechanical connections of the above assembling components are as shown in FIG. 4B. In operation, when Z-axis rotor 424 is turned on, it imparts a translational movement of A first horizontal tool head support board 438 at a velocity $V_z$ along the Z-axis of XYZ Cartesian coordinate 399. Z-axis sensor 427 records the positions and velocity $V_z$ of Z-axis sliding board 431.

Figure 5:
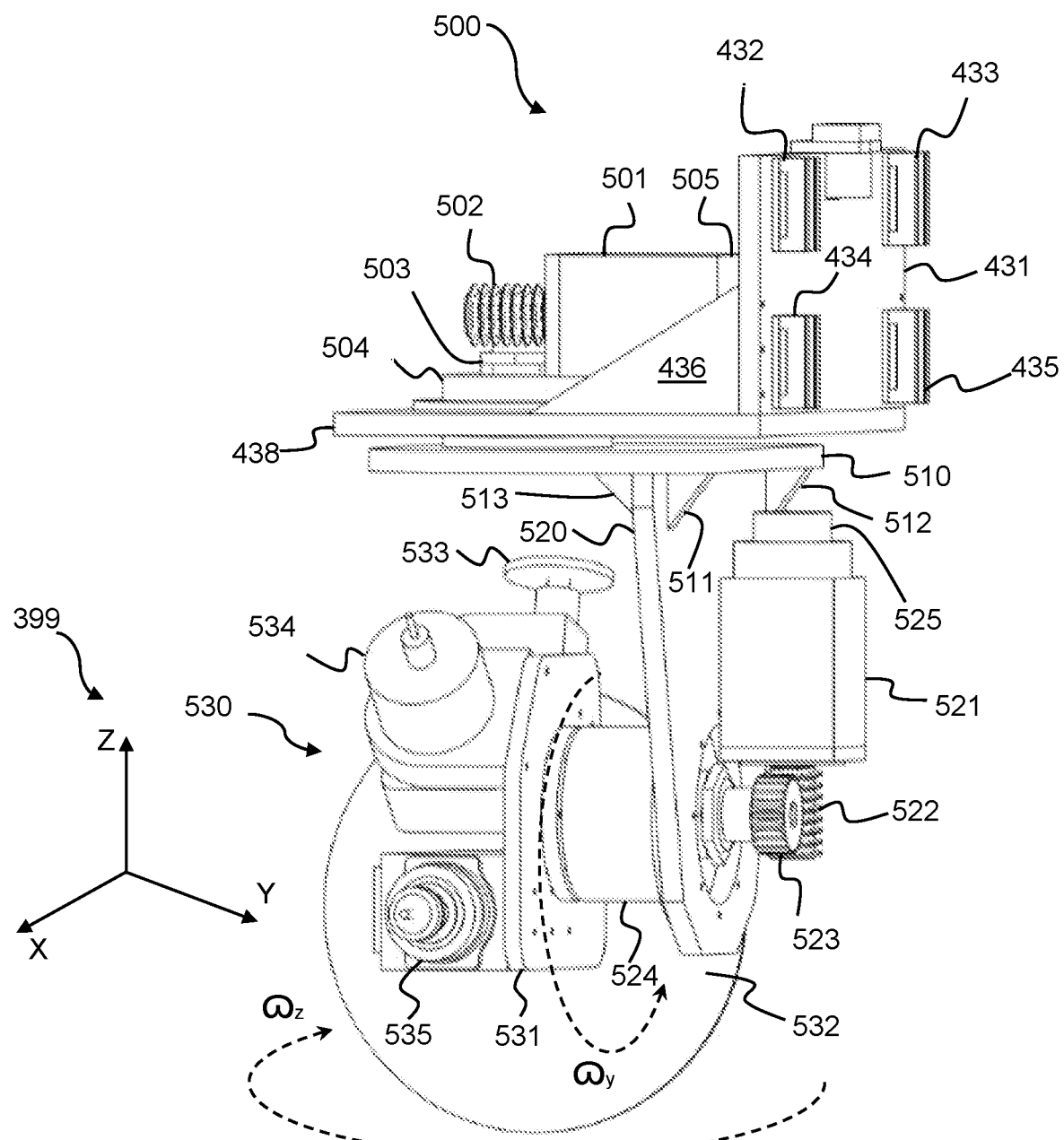
FIG. 5 is a 3D diagram illustrating the internal structure of the tool head for demonstrating that tools are arranged in different planes to achieve versatility in accordance with an embodiment of the present invention.

Next, referring to FIG. 5, a 3D diagram of the tool head unit 500 arranged in different planes to achieve versatility in accordance with an exemplary embodiment of the present is illustrated. Within the scope of the present invention, "different planes" means that the geometrical planes containing each machining tools are not parallel or the same. These planes are intersected to one another. A Z-axis tool head rotor 501, bolted firmly on the surface of first horizontal tool head support board 438, which includes a Z-axis driving gear 502, a Z-axis driven gear 503, a Z-axis end bearing support 504, and a Z-axis rotation sensor 505. Z-axis rotation sensor 505 senses the angular positions and angular velocity $\omega_z$ of tool head unit 500. A second horizontal tool head support board 510 is connected to first horizontal tool head support board 438 via a through hole and Z-axis end bearing support 504. A tool head main support board 520 is attached perpendicular to second horizontal tool head support board 510 along the Z-axis. A third Z-axis triangular support bracket 511, a fourth Z-axis triangular support bracket 512, a fifth Z-axis triangular support bracket 513, and a sixth Z-axis triangular support bracket 514 are used to secure the connections between second tool head support board 510 and tool head main support board 520 respectively. A Y-axis tool head rotor 521 including a Y-axis tool head rotation driving gear 522, a Y-axis tool head rotation driven gear 523, a Y-axis tool head rotation ball nut housing 524, and Y-axis tool head rotation sensor 525. Y-axis tool head sensor 525 senses the angular positions and angular velocity $\omega_y$ of a tool head 530. In various embodiments of the present invention, tool (machining) head 530 includes a tool head base 531, a cutting tool (saw) 532, a sanding tool (sander) 533, a drilling tool 534, and a chuck chisel tool 535. Cutting tool 532 is arranged in a separate YZ plane, while other tools 533-535 are arranged in a XZ plane at an obtuse angle relative to one another. With this novel arrangement, cutting tool (saw) 532 can move and rotate to cut workpiece 321 at any amount, any angle, and any location along its length.

Figure 6:
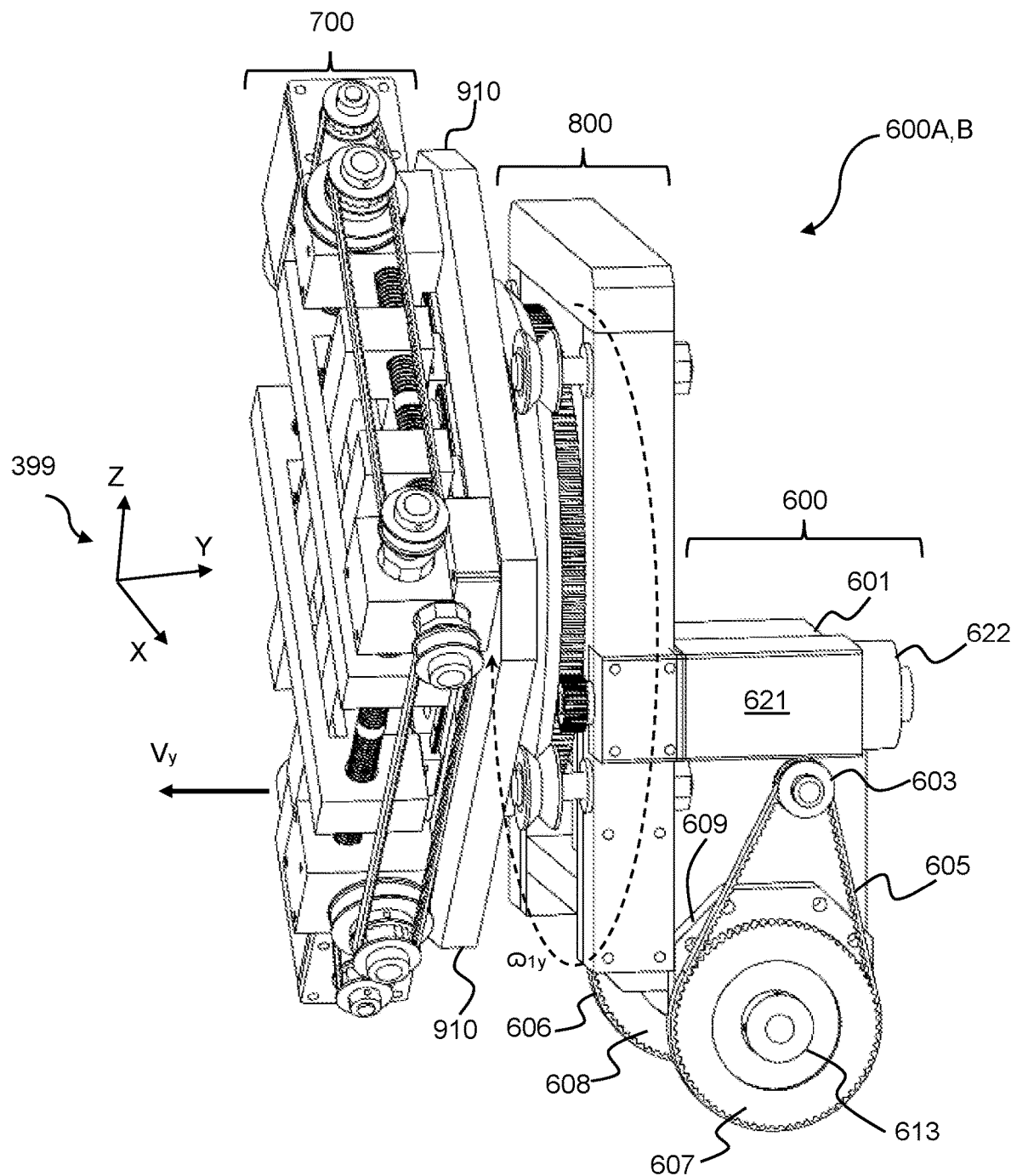
FIG. 6 is a 3D diagram illustrating the internal structure of the rotatable clamps in accordance with an exemplary embodiment of the present invention.

Referring now to FIG. 6 which illustrates a 3D perspective diagram depicting the internal structure of first and second rotatable clamps 600A-600B in accordance with an embodiment of the present invention is illustrated. In some embodiments of the present invention, first and second rotatable clamps 600A-600B have different structures. In many advantageous embodiments, first and second rotatable clamps 600A-600B have the same structure but they are positioned opposite to each other. In all embodiments, first and second rotatable clamps 600A-600B are operated independently and designed to lock a workpiece in from four directions resulting in the clamping force is distributed evenly at the center of gravity of workpiece 321. Structurally, first and second rotatable clamps 600A and 600B each includes a transport assembly 600, a four-direction square clamp assembly 700, a workpiece rotation assembly 800, and a rotation and clamp bracket 910. Transport assembly 600 moves first rotatable clamp 600A or 600B along X-axis first and second tool head rails 311-312 back and forth along the Y-axis. Four-direction square clamp assembly 700 rotates workpiece 321 360° around the Y-axis. Workpiece rotation assembly 800 holds workpiece 321 by clamping in from four directions so that the clamping force is distributed evenly at the center of gravity of workpiece 321.

Figure 6A:
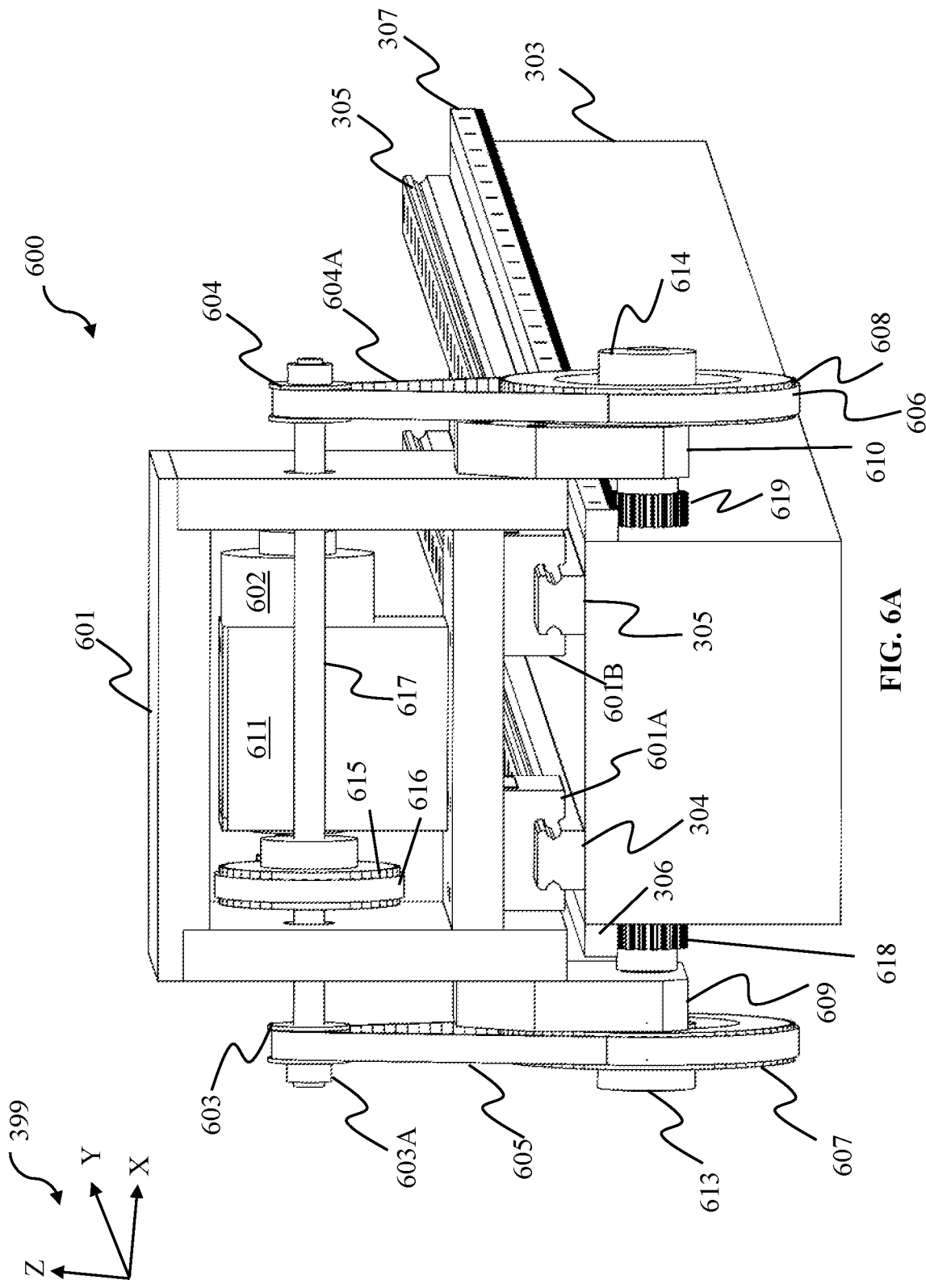
FIG. 6A is a 3D rear view of the transport housing of the clamping devices in accordance with an exemplary embodiment of the present invention

Referring to FIG. 6A, a 3D rear view of transport assembly is shown. FIG. 6 and FIG. 6A show the complete structure of transport assembly 600 which includes a transport housing 601 having a first Y-axis clamp slider 602A and a second Y-axis clamp slider 602B coupled to slide translationally in the Y-axis along first workpiece rail 304 and second workpiece rail 305 respectively. This translational movement is made possible by a Y-axis clamp rotor 611 coupled to a principal Y-axis clamp axle 615, a Y-axis main driving gear 620 (not shown), a Y-axis main driven gear 621, a first principal ball nut housing 616, and a second principal ball nut housing 617. Outside of transport housing 601, a first Y-axis clamp auxiliary driven pulley 603, a second Y-axis clamp auxiliary driven pulley 604, a first Y-axis clamp pulley belt 605, a second Y-axis clamp pulley belt 606, a third Y-axis clamp auxiliary driven pulley 607, a fourth Y-axis clamp auxiliary driven wheel 608 are all coupled to main axle 615. Next, a first auxiliary end stopper 603A is coupled to first Y-axis clamp auxiliary driven pulley 603. A second auxiliary end stopper 604A is coupled to second Y-axis clamp auxiliary driven pulley 604. A third auxiliary end stopper 613 is coupled to third Y-axis clamp auxiliary driven pulley 607. A fourth auxiliary end stopper 614 is coupled to fourth Y-axis clamp auxiliary driven pulley 608. Finally, a first Y-axis clamp ball nut housing 609 is mechanically connected to third auxiliary end stopper 613 and to a first Y-axis sliding gear 618. A second Y-axis clamp ball nut housing 610 is mechanically connected to fourth auxiliary end stopper 614 and to a second Y-axis sliding gear 619. A Y-axis clamp sensor 612 is coupled to sense the translational movements of Y-axis clamp rotor 611.

Figure 9:
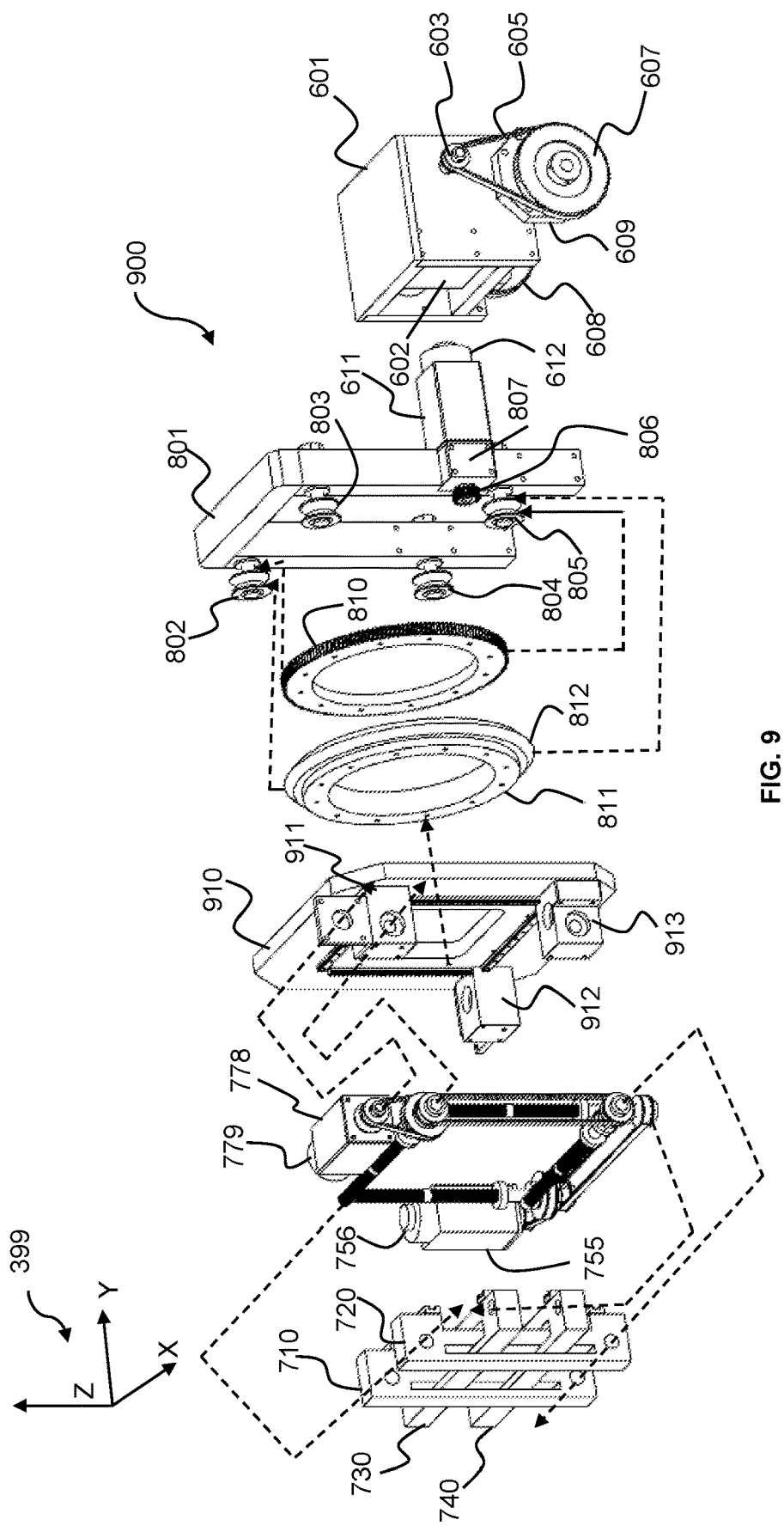
FIG. 9 is a 3D diagram illustrating how different parts of the CNC machining apparatus of the present invention are assembled together in accordance with an exemplary embodiment of the present invention.

These parts are assembled together as shown in FIG. 6, FIG. 6A, and FIG. 9. In operation, when Y-axis clamp rotor 611 is activated, principal Y-axis clamp axle 615 causes Y-axis main driving gear 620 to rotate, which imparts rotational motions to first driven auxiliary pulley 603, second Y-axis auxiliary driven pulley 604, third Y-axis clamp auxiliary driven pulley 607, and fourth Y-axis clamp auxiliary driven pulley 608 by means of first Y-axis clamp pulley belt 605 and second Y-axis clamp pulley belt 606 respectively. These rotational motions cause first Y-axis sliding gear 618 and second Y-axis sliding gear 619 to move back and forth along first lateral track 306 and second lateral track 307. As a result, first Y-axis clamp slider 602A and second Y-axis clamp slider 602B impart translational movement of transport housing 601 in the Y-axis along first workpiece rail 304 and second workpiece rail 305 respectively.

Figure 7:
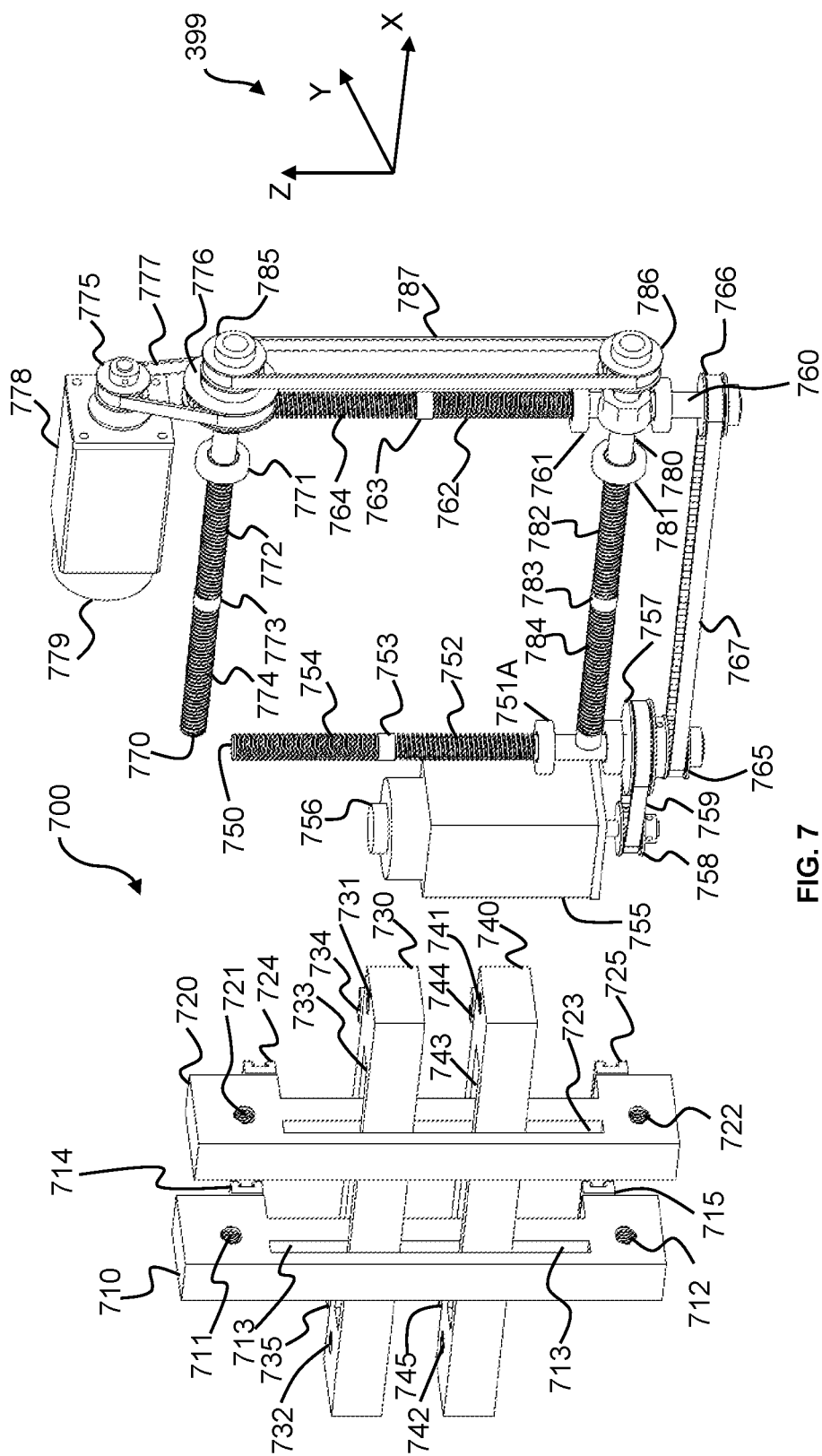
FIG. 7 is a 3D diagram illustrating the internal structure of a square clamp designed to consistently clamp the workpiece at its center of gravity in accordance with an embodiment of the present invention.

Referring next to FIG. 7, a 3D diagram of four-direction square clamp 700 designed to consistently clamp the workpiece at its center of gravity in accordance with an embodiment of the present invention is illustrated. Four-direction square clamp 700 includes a first vertical arm 710, a second vertical arm 720, a first horizontal arm 730, and a second horizontal arm 740. First vertical arm 710 includes a first screwed hole 711, a second screwed hole 712, a first insertion opening 713, a first coupling tooth 714, and a second coupling tooth 715. Similarly, second vertical arm 720 includes a third screwed hole 721, a fourth screwed hole 722, a second insertion opening 723, a third coupling tooth 724, and a fourth coupling tooth 725. First horizontal arm 730 includes a fifth screwed hole 731, a sixth screwed hole 732, a third insertion opening 733, a fifth coupling tooth 734, and sixth coupling tooth 735. Second horizontal arm 740 includes a seventh screwed hole 741, an eighth screwed hole 742, a fourth coupling opening 743, a seventh coupling tooth 744, and an eighth coupling tooth 745. Four-direction square clamp 700 also includes a first bi-directional screw 750, a second bi-directional screw 760, third bi-directional screw 770, and a fourth bi-directional screw 780. For connections, first vertical arm 710 is coupled to first and second horizontal arms 730 and 740 by coupling first insertion opening 713 into those of 733 and 743 respectively. Second vertical arm 720 is coupled to first and second horizontal arms 730 and 740 by coupling first insertion opening 723 into those of 733 and 743 respectively. In return, first horizontal arm 730 is coupled to first and second vertical arms 710 and 720 by coupling second insertion opening 723 into those of first insertion opening 713 and second insertion opening 723 respectively. Second horizontal arm 740 is coupled to first and second vertical arms 710 and 720 by coupling fourth insertion opening 743 into those of first insertion opening 713 and second insertion opening 723 respectively.

Continuing with FIG. 7, first bi-directional screw 750 includes a first bi-directional screw holder 751, a first direction screw thread 752, a first thread divider 753, and a second direction screw thread 754 opposite to first direction screw thread 752. Next to first bi-directional screw 750, a first vertical arm motor 755 coupled to a first vertical arm sensor 756, a first vertical arm driving pulley 757, a first vertical arm driven pulley 758, a first direction arm pulley belt 759. Second bi-directional screw 760 includes a third direction screw thread 762, a second thread divider 763, and a fourth direction screw thread 764 opposite in direction to third direction screw thread 762. Third direction screw thread 762 is held by a second bi-directional screw holder 761. Attached to first vertical arm driving pulley 757 includes a second vertical arm driven pulley 765, a second vertical arm driven pulley 766, and a second vertical arm pulley belt 767. Next, third bi-directional screw 770 includes a third horizontal arm driven pulley 776, a fifth direction screw thread 772, a third thread divider 773, and a sixth direction screw thread 774 opposite to fifth direction screw thread 772. Connected to third bi-directional screw holder 771 includes a third horizontal arm driving pulley 775, a third horizontal arm driven pulley 776, a third direction arm pulley belt 777, a horizontal arm rotor 778, and a horizontal arm sensor 779. Finally, fourth bi-directional screw 780 includes a fourth bi-directional screw holder 781, a seventh direction screw thread 782, a fourth thread divider 783, and an eighth direction screw thread 784 opposite to seventh direction crew thread 782. Attached to third horizontal arm driven pulley 776 includes a fourth horizontal driving pulley 785, a fourth direction driven pulley 786, and a fourth horizontal pulley belt 787.

For connections, first bi-directional screw 750 is inserted into eighth screwed hole 742 and sixth screwed hole 732. Second bi-directional screw 760 is inserted into seventh screwed hole 741 and fifth screwed hole 731. Third bi-directional screw 770 is inserted into fourth screwed hole 722 and second screwed hole 712. Third bi-directional screw 770 is inserted into fourth screwed hole 721 and first screwed hole 711. In operation, in clamping cycle, as first vertical arm motor 755 is turned on, first vertical arm driving pulley 758 and first direction arm pulley belt 759 impart rotation to second vertical arm driven pulley 765; in turn, also imparting rotation to driven pulley 766. Both rotations cause first bi-directional screw 750 and second bi-directional screw 760 to move in. At the same time, as horizontal arm rotor 778 is turned on, third horizontal arm driving pulley 775 and third horizontal arm driven pulley 776 impart rotation to fourth horizontal driving pulley 785; in turn, also imparting rotation to fourth horizontal driven pulley 786. Both rotations cause third bi-directional screw 770 and fourth bi-directional screw 780 to move in. In releasing cycle, first direction motor 755 and horizontal arm rotor 778 rotate in reverse direction. First vertical arm sensor 756 and horizontal arm sensor 779 sense the positions and velocities of first to fourth bi-directional screws 750-780.

Four-direction square clamp 700 of the present invention achieve the following objects:
(1) Firmly holding from all directions so that workpiece 321 does not slid out of clamping; and
(2) The clamping forces are evenly distributed at the center of gravity so that workpiece 321 does not move when head tool unity 500 operate thereon for a long period of time with a large force.

Figure 8:
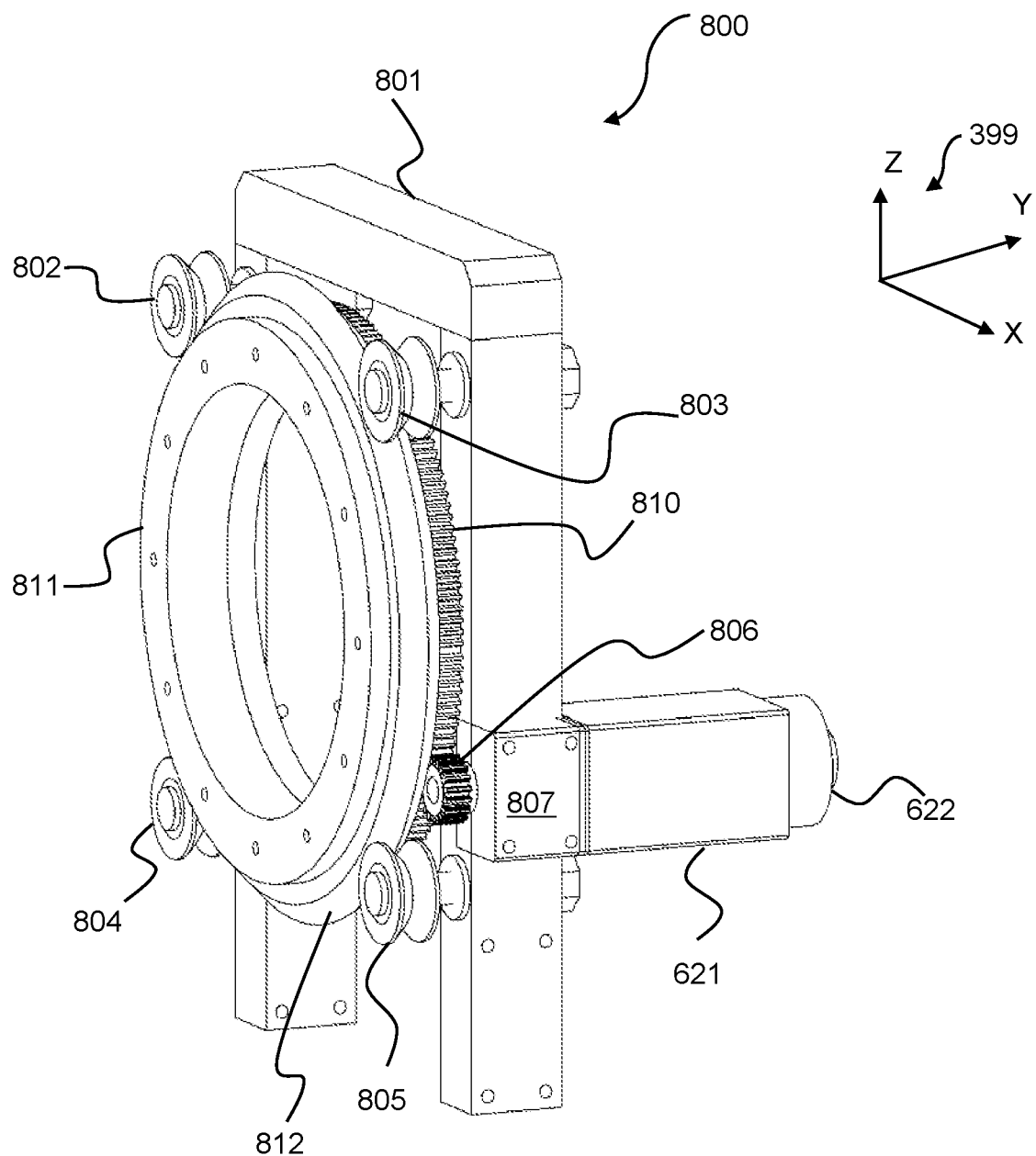
FIG. 8 is a 3D diagram illustrating the internal structure of the rotation assembly of the rotatable clamps in accordance with an embodiment of the present invention.

Referring now to FIG. 8, a 3D diagram of the internal structure of workpiece rotation assembly 800 of first and second rotatable clamps 600A-600B in accordance with an embodiment of the present invention is illustrated. Workpiece rotation assembly 800 includes a Y-axis rotation frame 801. In many embodiments, Y-axis rotation frame 801 is an inverted U-shaped having a first knob 802, a second knob 803, a third knob 804, and a fourth knob 805 arranged around the two branches of Y-axis rotation frame 801. A Y-axis rotation clamp driving gear 806 and a Y-axis rotation ball nut housing 807 are connected to Y-axis clamp rotor 611 and Y-axis clamp sensor 612. A workpiece rotation bracket 811 is coupled to Y-axis rotation clamp driving gear 806 and fits snugly into knobs 802-805. A workpiece rotation bracket 811 having a circumferential lip 812 is bolted to Y-axis rotation clamp driving gear 806. In operation, as Y-axis clamp rotor 611 is turned on, Y-axis rotation clamp driving gear 806 causes workpiece rotation gear 810 to turns either clockwise or counter-clockwise, which causes workpiece 321 to rotate 360° around the Y-axis, exposing all sides to head tool unit 500 to machine thereon.

Referring to FIG. 9, is a 3D diagram 900 demonstrating how different parts of the CNC machining apparatus of the present invention are assembled together in accordance with an exemplary embodiment of the present invention is illustrated. After four-direction square clamp assembly 700 and workpiece rotation assembly 800 are assembled as discussed in FIG. 7 and FIG. 8, a rotation and clamp coupler 910 having a first rotation pulley ball nut housing 911, a second rotation pulley ball nut housing 912, and a third rotation pulley ball nut housing 913 which connect four-direction square clamp assembly 700 and workpiece rotation assembly 800. Coupler is a square ring having holes around its surface. First rotation pulley ball nut housing 911 is connected to horizontal arm rotor 778. Second rotation pulley ball nut housing 912 is connected to rotor 755. Third rotation pulley ball nut housing 913 to fourth horizontal driven pulley 786.

First and second rotatable clamps 600A and 600B of the present invention achieve the following objects:
Rotation around Y-axis;
Moving linearly back and four along the Y-axis;
Clamping to hold workpiece 321 in all directions with clamping forces distributed evenly at the center of gravity; and
Independently controlled by CNC controller box 350: first rotatable clamp 600A and second rotatable clamp 600B are operated totally independent to each other.

FIG. 3 to FIG. 9 above disclose the mechanical components, connections, electrical motors, rotors, and sensors show that CNC machining apparatus 300 achieves omni-directional movements including:
(a) Y-axis and Z-axis 360° rotations combined with X-axis and Y-axis linear translational movements of tool head unit 500;
(b) Y-axis translational movements and 360° rotation around the Y-axis of four direction square clamps 600A-600B; and
(c) four direction square clamps 600A-600B can firmly hold workpiece 321 with clamping forces distributed evenly at the center of gravity thereof; and
(d) four direction square clamps 600A-600B are positioned opposite to each other and independently operated by CNC controller box 350.

Figure 10:
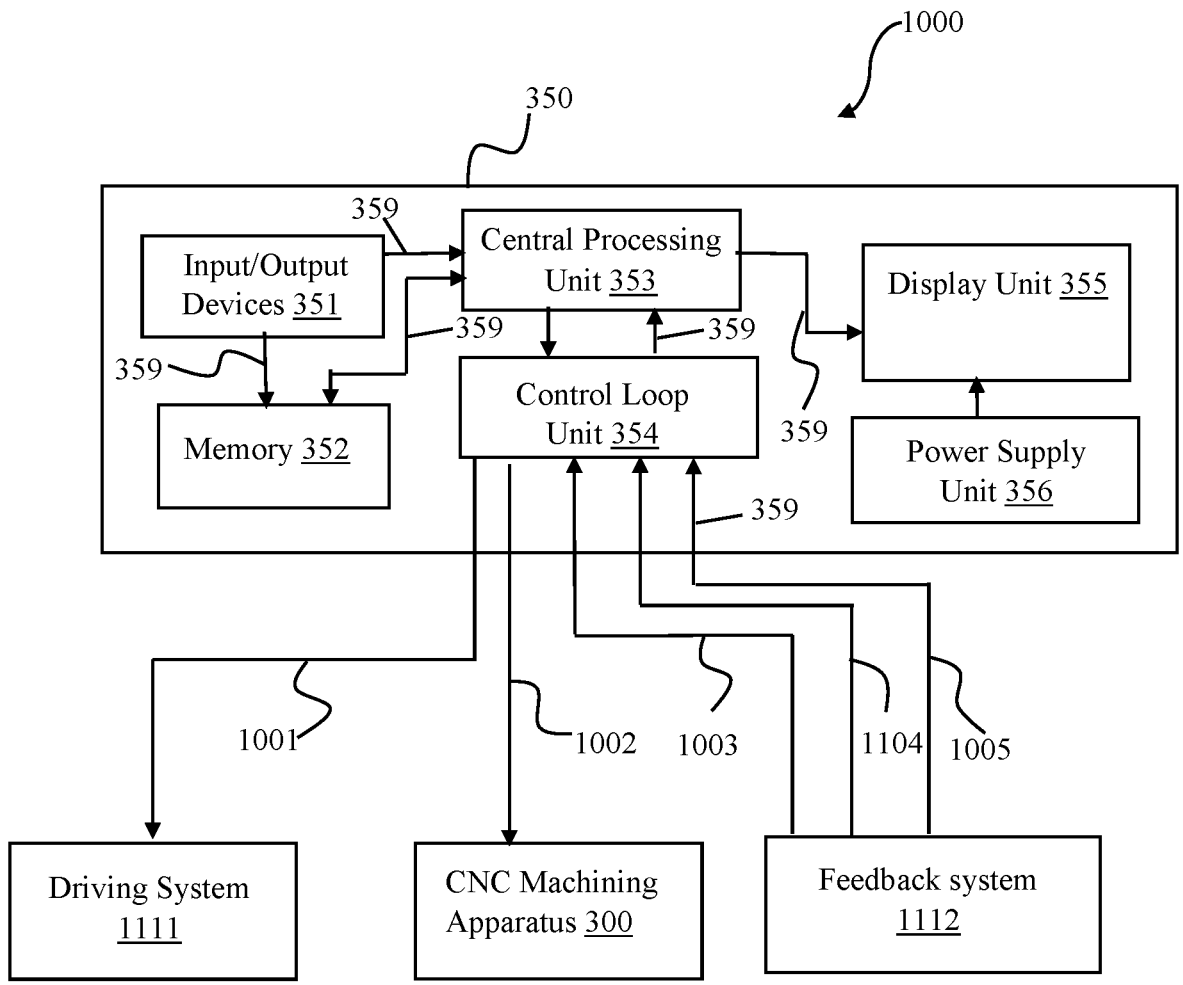
FIG. 10 is a schematic diagram of the CNC controller box of CNC machining apparatus in accordance with an exemplary embodiment of the present invention.
Figure 11:
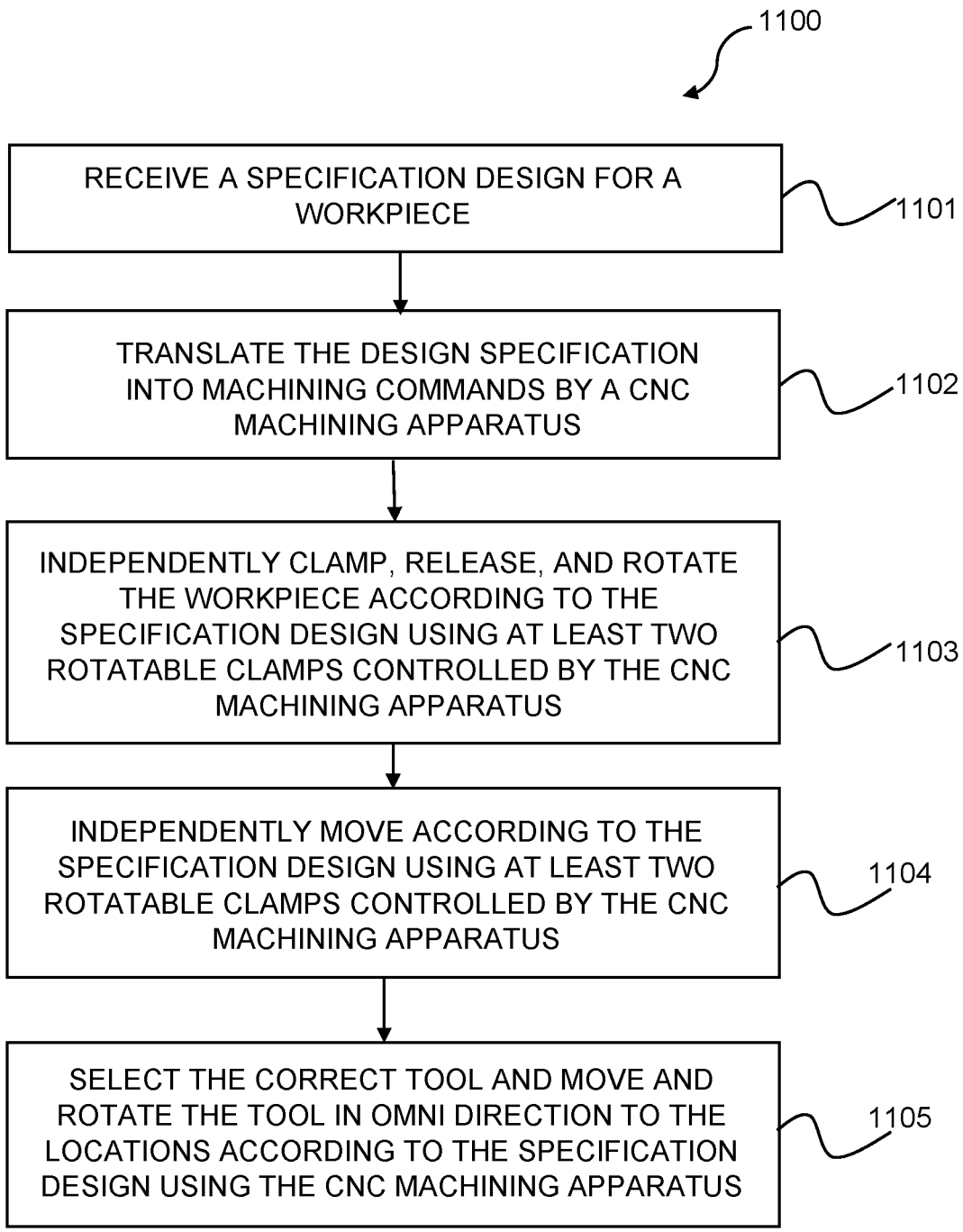
FIG. 11 is a flow chart illustrating a method for CNC machining a workpiece in accordance with an exemplary embodiment of the present invention.

Now FIG. 10-FIG. 11 disclose the electrical hardware and software that numerically control the operations of CNC machining apparatus 300.

Now referring to FIG. 10, a schematic diagram of a CNC system 1000 which includes CNC machining apparatus 300 electrically coupled to CNC controller box 350 in accordance with an exemplary embodiment of the present invention is illustrated. CNC system 1000 includes CNC controller box 350 electrically coupled to numerically control CNC machining apparatus 300. CNC controller box 350 includes, but not limited to, input/output devices 351, memory 352, a central processing unit (CPU) 353, a control loop unit 354, a display unit 355, and a power supply unit 356, all electrically coupled to one another via electrical connections 1001, 1002, 1103, 1004, and 1005. More particularly, control loop unit 354 is connected to a driving system 1111 via driving signal connections 1001, CNC machining apparatus 300 via electrical connections 1002, and to feedback system 1112 via position electrical connections 1003, linear velocity electrical connections 1004, and angular velocity connections 1005.

In various embodiments of the present invention, CNC controller box 350 is a printed circuit board (PCB) with electrical connections 359 are conducting wires such as copper, aluminum, gold, etc. In operation, input/output devices 351 receive design specifications from clients' communication devices such as smartphones, desktop computers, laptop computers, personal digital assistance (PDA) via a network. The network may be wireless such as Bluetooth, 4G, LTE, 5G, Wi-Fi, Zigbee, Z-wave, radio frequency (RF), Near Field Communication (NFC), Ethernet, LoRaWAN. The network can be wired such as RS-232, RS-485, or USB. Next, the design specification is transferred to CPU 353 for translation into software command codes that can numerically control CNC machining apparatus 300. The design specification can be generated from CAD (computer aided design) and/or CAM (computer aided machining). The software commands can be G-programming, M programming, automatically programming tool (APT), assembly language, C, C++, or any CNC programming language. The design specification and the software commands are stored in memory 352. In addition, CPU 353 sends the software commands and/or the design specification to be displayed at display unit 355. In some embodiments, display unit 355 also displays the current status of any on-going machine work so that workers or operators can view the present machining process. In some other embodiments, input/output devices 351 can send the current machining work to the display units of the communication devices of the end-users.

Continuing with FIG. 10, CPU 353 controls a control loop unit 354 to control the entire operation loops of CNC machining apparatus 300. A driving system 1111 and CNC machining apparatus 300 as described in FIG. 3-FIG. 9 above are electrically connected to be controlled by control loop unit 354. In various embodiments, a feedback system 1112 which is constituted of sensors 417, 427, 505, 525, 612, 756, and 779, and electrical connections position electrical connections 1003, linear velocity electrical connections 1004, and angular velocity connections 1005. Electrical connections 1003-1005 can be wired such as RS-232, RS-485 and wireless such as Bluetooth, 4G, LTE, 5G, Wi-Fi, Zigbee, Z-wave, radio frequency (RF), Near Field Communication (NFC), Ethernet, LoRaWAN.

Finally, referring to FIG. 11, a flow chart for a method 1100 of CNC machining a workpiece in accordance with an exemplary embodiment of the present invention is illustrated. Method 1100 is used in CNC machining apparatus 300 as described above in FIG. 3-FIG. 10.

At step 1101, a design specification is received. Within the meaning of the present disclosure, the design specification is defined as detailed machining operations on a workpiece to create uniform final products such as table legs having a particular design and cut at a particular length. The design specification is described by a CAD, CAM program with exact dimensions. Step 1101 is realized by CNC controller box 350 with the aid of input/output devices 351.

At step 1102, the design specification is translated into a software program understood and operable on a CNC machining apparatus. In various embodiments, the software program includes M-codes, G-codes, and automatically programming tool (APT), or any CNC programming language. Step 1102 is realized by CPU 353 in CNC controller box 350.

At step 1103, rotatable clamps are numerically clamped, released, and rotated a workpiece in accordance with the pattern described in the design specification. Step 1103 is realized by rotatable clamps 600A-600B, CPU 353, control loop unit 354, feedback system 1112 which further includes sensors 417, 427, 505, 525, 612, 756, and 779, and electrical connections position electrical connections 1003, linear velocity electrical connections 1004, and angular velocity connections 1005.

At step 1104, rotatable clamps are numerically moved so as a workpiece is linearly traversed along the Y-axis. Step 1104 is realized by rotatable clamps 600A-600B, CPU 353, and control loop unit 354, feedback system 1112 which further includes sensors 417, 427, 505, 525, 612, 756, and 779, and electrical connections position electrical connections 1003, linear velocity electrical connections 1004, and angular velocity connections 1005.

At step 1105, a tool head assembly is moved in omni-directional and the required tool head is selected. Step 1105 is realized by clamps 600A-600B, CPU 353, and control loop unit 354, feedback system 1112 which further includes sensors 417, 427, 505, 525, 612, 756, and 779, and position electrical connections 1003, linear velocity electrical connections 1004, and angular velocity connections 1005.

Method 1100 and CNC machining apparatus 300 of the present invention achieve the following objectives:
(a) Y-axis and Z-axis 360° rotations combined with X-axis and Y-axis linear translational movements of tool head unit 500;
(b) Y-axis translational movements and 360° rotation around the Y-axis of four direction square clamps 600A-600B; and
(c) four direction square clamps 600A-600B can firmly hold workpiece 321 with clamping forces distributed evenly at the center of gravity thereof;
(d) First and second rotatable clamps 600A-600B are positioned opposite to each other and independently operated by CNC controller box 350;
(e) network connection between CNC machining apparatus 300 and end-users' communication devices;
(f) fully automated; and
(g) simple in design and highly precise since all sides, any locations, any length, any material of workpiece can be machined.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

Within the scope of the present description, the reference to "an embodiment" or "the embodiment" or "some embodiments" means that a particular feature, structure or element described with reference to an embodiment is comprised in at least one embodiment of the described object. The sentences "in an embodiment" or "in the embodiment" or "in some embodiments" in the description do not therefore necessarily refer to the same embodiment or embodiments. The particular feature, structures or elements can be furthermore combined in any adequate way in one or more embodiments.

Within the scope of the present description, the word "omni-directional" means all directions of a spherical coordinate covering the same space of XYZ Cartesian coordinate 399. The X-axis and Z-axis translational (or linear) movements, the rotational Y-axis and Z-axis of the head tool assembly; the Y-axis translational movements, and the rotation 360° around the Y-axis enable CNC machining apparatus 300 to approach from any angle and operate precisely at any location regardless of the proximity of these points on workpiece 321.

Within the scope of the present description, the words "connected", "connecting", "coupled", "coupling", "connections", "coupled", "bolted", "laid", "positioned", "attached", "attaching", "affixed", "affixing" are used to mean attaching between two described members using screws, nails, tongs, prongs, clips, spikes, staples, pins, male and female nuts, buttons, sleeves, lugs, cams, handles, bars, fasteners, connectors, or the likes.

Within the scope of the present description, the words "connected", "connecting", "coupled", "coupling", "connections", "coupled" are used to mean wired and/or wireless connections. Wired connections include electrically conducting wires, cables, lines, coaxial cables, strips, or the likes. Conducting wires are made of conductors such as coppers, aluminum, gold, or the likes. Wireless connections include electromagnetic waves, short range communication channels include ZigBee™/IEEE 802.15.4, Bluetooth™, Z-wave, NFC, Wi-fi/802.11, cellular (e.g., GSM, GPRS, WCDMA, HSPA, and LTE, 5G, etc.), IEEE 802.15.4, IEEE 802.22, ISA100a, wireless USB, and Infrared (IR), LoRa devices, etc. Medium range wireless communication channels in this embodiment of communication link 161 include Wi-fi and Hotspot. Long range wireless communication channels include UHF/VHF radio frequencies.

Within the scope of the present description, the word "network" includes data center, cloud network, or network such as nano network, body area network (BAN), personal area network (PAN), local area network (LAN), campus/corporate area network (CAN), metropolitan area network (MAN), wide area network (WAN), and mesh area networks, or any combinations thereof.

Within the scope of the present description, the word "rotation", "rotating", "rotate" includes clockwise and/or counterclockwise direction.

Within the scope of the present invention, the Cartesian XYZ coordinate (x, y, z) also includes equivalent spherical coordinate (r, ϴ, Φ), and/or cylindrical coordinate (r, ϴ, Φ) that can determine the direction of movement or coordinate of a point of any members of CNC machining apparatus.

DESCRIPTION OF NUMERALS

300 Computer Numerical Control (CNC) machining apparatus
301 first base
301P proximate end (of the first base)
301D distal end (of the first base)
301T top surface (of the first base)
302 second base (perpendicular to the first base)
303 workpiece rail support base
304 first workpiece rail
305 second workpiece rail
306 first lateral track
307 second lateral track
310 X-axis tool head support
311 first X-axis tool head rail
312 second X-axis tool head rail
321 workpiece
350 CNC controller box
351 Input/output devices
352 memory
353 central processing unit (CPU)
354 control loop unit
355 display unit
356 power supply unit
359 controller box internal electrical connections
399 XYZ Cartesian coordinate
400 tool head support assembly
400A X-axis tool head moving assembly
400B Z-axis tool head moving assembly
401 X-axis sliding board
402 first X-axis slider
403 second X-axis slider
404 third X-axis slider
405 fourth X-axis slider
410 X-axis moving end
410A X-axis lock screw (stopper)
410B X-axis moving side ball nut housing
411 X-axis fixed end
411A fixed side ball nut housing
411B fixed side support unit
411C second fixed side support unit
411D X-axis lock screw (stopper)
412 X-axis ball screw
413 X-axis rotor
414 X-axis driving pulley
415 X-axis driven pulley
416 X-axis pulley belt
417 X-axis sensor
420 Z-axis rail support board
421 first X-axis triangular support bracket
422 second X-axis triangular support bracket
423 Z-axis rotor support board
424 Z-axis rotor
425 Z-axis driving gear
426 Z-axis driven gear
426A Z-axis ball screw
426B Z-axis flanged nut
426C Z-axis bracket
426D Z-axis second shaft coupler
426E Z-axis first shaft coupler
426F Z-axis ball nut housing
426G Z-axis end-bearing support
427 Z-axis sensor
428 first Z-axis rail
429 second Z-axis rail
431 Z-axis sliding board
432 first Z-axis slider
433 second Z-axis slider
434 third Z-axis slider
435 fourth Z-axis slider
436 first Z-axis triangular support bracket
437 second Z-axis triangular support bracket
438 first horizontal tool head support board
500 tool head unit
501 Z-axis tool head rotor
502 Z-axis driving gear
503 Z-axis driven gear
504 Z-axis end bearing support
505 Z-axis rotation sensor
510 second horizontal tool head support board
511 third Z-axis triangular support bracket
512 fourth Z-axis triangular support bracket
513 fifth Z-axis triangular support bracket
514 sixth Z-axis triangular support bracket
520 tool head main support board
521 Y-axis tool head rotor
522 Y-axis tool head rotation driving gear 523 Y-axis tool head rotation driven gear
524 Y-axis tool head rotation ball nut housing
525 Y-axis tool head rotation sensor
530 tool head unit
531 tool head base
532 cutting tool (saw)
533 sanding tool (sander)
534 drilling tool
535 chuck chisel tool
600A first rotatable clamp
601 transport housing
602A first Y-axis clamp slider
602B second Y-axis clamp slider
603 first Y-axis clamp auxiliary driven wheel
603A first auxiliary end stopper
604 second Y-axis clamp auxiliary driven wheel
604A second auxiliary end stopper
605 first Y-axis clamp pulley belt
606 second Y-axis clamp pulley belt
607 third Y-axis clamp auxiliary driven wheel
608 fourth Y-axis clamp auxiliary driven wheel
609 first Y-axis clamp ball nut housing
610 second Y-axis clamp ball nut housing
611 Y-axis clamp rotor
612 Y-axis clamp sensor
613 third auxiliary end stopper
614 fourth auxiliary end stopper
615 principal Y-axis clamp axle
616 first principle ball nut housing
617 second principal ball nut housing
618 first Y-axis sliding gear
619 second Y-axis sliding gear
620 Y-axis main driving gear
621 Y-axis main driven gear
700 four-direction square clamp assembly
710 first vertical arm
711 first screwed hole
712 second screwed hole
713 first insertion opening
714 first coupling tooth
715 second coupling tooth
720 second vertical arm
721 third screwed hole
722 fourth screwed hole
723 second insertion opening
724 third coupling tooth
725 fourth coupling tooth
730 first horizontal arm
731 fifth screwed hole
732 sixth screwed hole
733 third coupling opening
734 fifth coupling tooth
735 sixth coupling tooth
740 second horizontal arm
741 seventh screwed hole
742 eighth screwed hole
743 fourth coupling opening
744 seventh coupling tooth
745 eighth coupling tooth
750 first bi-directional screw
751 first bi-directional screw holder
752 first direction screw thread
753 first thread divider
754 second direction screw thread
755 first vertical arm motor
756 first vertical arm sensor
757 first vertical arm driving pulley
758 first vertical arm driven pulley
759 first direction arm pulley belt
760 second bi-directional screw
761 second bi-directional screw holder
762 third direction screw thread
763 second thread divider
764 fourth direction screw thread
765 second vertical arm driven pulley
766 second vertical arm driven pulley
767 second vertical arm pulley belt
770 third bi-directional screw
771 third bi-directional screw holder
772 fifth direction screw thread
773 third thread divider
774 sixth direction screw thread
775 third horizontal arm driving pulley
776 third horizontal arm driven pulley
777 third horizontal arm pulley belt
778 horizontal arm rotor
779 horizontal arm sensor
780 fourth bi-directional screw
781 fourth bi-directional screw holder
782 seventh direction screw thread
783 fourth thread divider
784 eighth direction screw thread
785 fourth horizontal driving pulley
786 fourth horizontal driven pulley
787 fourth horizontal pulley belt
800 workpiece rotation assembly
801 Y-axis rotation frame
802 first knob
803 second knob
804 third knob
805 fourth knob
806 Y-axis rotation clamp driving gear
807 Y-axis rotation ball nut housing
810 workpiece rotation gear
811 workpiece rotation bracket
900 rotatable clamp components and instructions
910 rotation and clamp bracket
911 first rotation pulley ball nut housing
912 second rotation pulley ball nut housing
913 third rotation pulley ball nut housing
1000 schematic diagram of the CNC controller box
1001 driving electrical signal connections
1002 electrical connections to CNC machining apparatus
1003 position information electrical connections
1004 velocity information electrical connections
1005 angular velocity information electrical connections

What is claimed is:

1. A computer numerical control (CNC) machining apparatus, comprising:
a first base having a top side, a bottom side, a width, and a length having a first end and an opposing second end, wherein said length spans along a Y-axis of a three-dimension (3D) Cartesian orthogonal coordinate system, wherein said three-dimension (3D) Cartesian orthogonal coordinate system further has an X-axis and a Z-axis;
a second base vertically erected in said Z-axis and on said top side at said second end, wherein a longitudinal axis of said second base extends perpendicular to a longitudinal axis of said first base;
a tool head support assembly that carries a tool head, wherein the tool head support assembly both pivots the tool head and linearly displaces the tool head; and a plurality of rotatable clamps, each of which is configured to independently hold, release, and move a workpiece along said Y-axis, and each of which is configured to independently rotate the workpiece 360° about said Y-axis, wherein each of the plurality of rotatable clamps comprises a respective four-directional square clamp that slides in or out in four directions so as to hold or to release said workpiece, wherein each four-directional square clamp comprises:
two first arms for holding the workpiece, each of the two first arms having a respective longitudinal axis, wherein the longitudinal axis of one of the two first arms extends parallel to the longitudinal axis of another of the two first arms;
two second arms for holding the workpiece, each of the two second arms having a respective longitudinal axis, wherein the longitudinal axis of one of the two second arms extends parallel to the longitudinal axis of another of the two second arms and further extends perpendicular to the respective longitudinal axis of each of the two first arms;
a first bi-direction screw, a second bi-directional screw, a third bi-directional screw, and a fourth bi-directional screw,
wherein the first bi-directional screw extends into and through each of the two second arms, and wherein the second bi-directional screw also extends into and through each of the two second arms and is oriented such that a longitudinal axis of the second bi-directional screw extends parallel to the longitudinal axis of the first bi-directional screw, and wherein rotation of the first and second bi-directional screws moves the two second arms toward and away from one another;
wherein the third bi-directional screw extends into and through each of the two first arms, and wherein the fourth bi-directional screw also extends into and through each of the two first arms and is oriented such that a longitudinal axis of the fourth bi-directional screw extends parallel to the longitudinal axis of the third bi-directional screw, and wherein rotation of the third and fourth bi-directional screws moves the two first arms toward and away from one another.

2. The apparatus of claim 1 further comprising a computer numerical control (CNC) controller configured to:
receive a design specification from end-users;
translate said design specification into a geometrical pattern realized by a software program including executable commands that numerically control said tool head support assembly, said plurality of rotatable clamps, and said tool head to machine said workpiece according to said design specification and said geometrical pattern.

3. The apparatus of claim 2 wherein said CNC controller further comprises:
input devices configured to receive said design specification for said workpiece;
a data processor configured to translate said design specification into a pattern coded into software commands;
a memory, electrically coupled to a microprocessor, configured to store said design specification generated by a computer aided design (CAD) program and said software commands; and
a feedback system configure to receive position data, motion data, rotation data from said tool head and said plurality of rotatable clamps and to feed back for numerical control of said tool head and said plurality of rotatable clamps.

4. The apparatus of claim 3 wherein:
said feedback system is configured to measure positions, linear velocities, and rotational velocities of an X-axis sensor, a Z-axis sensor, a Y-axis tool head rotation sensor, a Z-axis tool head rotation sensor, and a first Y-axis clamp rotation sensor.

5. The apparatus of claim 1 wherein pivoting and linear displacement of said tool head is characterized by:
(a) a first linear movement in said Z axis;
(b) a second linear movement in said X axis;
(c) a first rotational movement in 360° about said Z axis; and
(d) a second rotational movement in 360° about said Y-axis.

6. The apparatus of claim 1 wherein each of said plurality of rotatable clamps further comprises:
a respective transport assembly configured to move linearly along said Y-axis; and
a respective rotation assembly, mechanically coupled to said transport assembly, configured to rotate 360° about said Y-axis.

7. The apparatus of claim 6 wherein:
the one of the two first arms comprises a first screwed hole, a second screwed hole, and an insertion opening located between said first screwed hole and said second screw hole;
the another of the two first arms comprises a third screwed hole, a fourth screwed hole, and a second insertion opening located between said third screwed hole and said fourth screw hole;
the one of the two second arms comprises a fifth screwed hole, a sixth screwed hole, and a third insertion opening located between said fifth screwed hole and said sixth screw hole; and
the another of the two second arms comprises a seventh screwed hole, an eighth screwed hole, and a fourth insertion opening located between said seventh screwed hole and said eighth screw hole,
wherein the one of the two second arms and the another of the two second arms are inserted into said first insertion opening and said second insertion opening, and the one of the two first arms and the another of the two first arms are inserted into said third insertion opening and said fourth insertion opening.

8. The apparatus of claim 7 wherein:
the first bi-directional screw has a first direction screw pattern, a first divider, and a second direction screw pattern opposite to said first direction screwed pattern;
the second-bidirectional screw has a third direction screw pattern, a second divider, and a fourth direction screw pattern opposite to said third direction screwed pattern;
the third bi-directional screw has a fifth direction screw pattern, a third divider, and a sixth direction screw pattern opposite to said fifth direction screwed pattern; and
the fourth bi-directional screw has a seventh direction screw pattern, a fourth divider, and an eighth direction screw pattern opposite to said seventh direction screwed pattern, wherein:
said first bi-directional screw is inserted into said fifth screwed hole and said seventh screwed hole;
said second bi-directional screw is inserted into said sixth screwed hole and said eighth screwed hole;

said third bi-directional screw is inserted into said first screwed hole and said third screwed hole; and
said fourth bi-directional screw is inserted into said second screwed hole and said fourth screwed hole.

9. The apparatus of claim 7 wherein each respective four-directional square clamp further comprises:
a respective first clamping rotor;
a respective first clamping pulley assembly mechanically coupled to said first clamping rotor so as to cause the one of the two second arms and the another of the two second arms to move in together to clamp said workpiece and/or to move out together to release said workpiece;
a respective second clamping rotor;
a respective second clamping pulley assembly mechanically coupled to said second clamping rotor so as to cause the one of the two first arms and the another of the two first arms to move in together to clamp said workpiece and/or to move out together to release said workpiece.

10. The apparatus of claim 6 wherein each respective rotation assembly further comprises:
a respective Y-axis clamp rotation gear;
a respective Y-axis clamp rotation gasket mechanically coupled to said Y-axis clamp rotation gear, wherein said Y-axis clamp rotation gasket further comprises a Y-axis clamp rotation ring having the same diameter as said Y-axis clamp rotation gear, and an outer lip positioned around a circumference of said rotation gasket;
a respective Y-axis clamp rotation motor coupled to rotate said Y-axis clamp rotation gear and said Y-axis clamp rotation gasket 360°; and
a respective Y-axis clamp rotation sensor.

11. The apparatus of claim 1 further comprising:
a workpiece rail support deposited on said top side of said first base; and
a pair of parallel workpiece rails secured on a top surface of said workpiece rail support.

12. The apparatus of claim 11 wherein said plurality of rotatable clamps further comprises:
a first rotatable clamp coupled to said pair of parallel workpiece rails; and
a second rotatable clamp positioned opposite to said first rotatable clamp, and
wherein said second rotatable clamp is numerically controlled by said controller to move and rotate independent of said first rotatable clamp.

13. The apparatus of claim 1 wherein said tool head support assembly further comprises:
an X-axis rail support, fixed on top of said second base, comprising a first X-axis rail and a second X-axis rail parallel to said first axis rail;
a first X-axis slider, mechanically connected to a back of said X-axis tool head support, coupled to said first X-axis rail;
a second X-axis slider, mechanically connected to said back of said X-axis tool head support, coupled to said first X-axis rail;
a third X-axis slider, mechanically connected to said back of said X-axis tool head support, coupled to said second X-axis rail;
a fourth X-axis slider, mechanically connected to said back of said X-axis tool head support, coupled to said second X-axis rail;
a X-axis rotor, coupled to said X-axis tool head support by a X-axis ball nut housing and an X-axis pulley assembly, wherein said X-axis pulley further comprises:

a X-axis driving pulley connected to said X-axis rotor;
a X-axis driven (output) pulley;
a X-axis ball screw connected to said X-axis driven pulley at a first end;
a X-axis slide stopper connected to said X-axis driven pulley at a second end, wherein said X-axis ball screw is inserted thru said X-axis ball nut housing; and
a X-axis sensor configured to sense said X-axis movement of said tool head support assembly.

14. The apparatus of claim 13 wherein said tool head support assembly further comprises:
Z-axis rail support, mechanically coupled to said X-axis rail support, having a first Z-axis rail and a second Z-axis rail;
a Z-axis rotor support mechanically connected perpendicular to said Z-axis rail support;
a first Z-axis slider coupled to said first Z-axis rail;
a second Z-axis slider coupled to said first Z-axis rail;
a third Z-axis slider coupled to said second Z-axis rail;
a fourth Z-axis slider coupled to said second Z-axis rail;
a vertical Z-axis tool head support mechanically connected to said first to said fourth Z-axis sliders;
a horizontal Z-axis tool head support mechanically connected to said vertical Z-axis tool head support;
a Z-axis rotor positioned on top of said Z-axis rotor support;
a Z-axis driving gear;
a Z-axis driven gear engaged to said Z-axis driving gear;
an elongated threaded pin connected to said Z-axis driven gear at one end and said vertical Z-axis tool head support via a Z-axis ball housing; and
a Z-axis sensor.

15. The apparatus of claim 13 wherein said tool head support assembly further comprises:
a second horizontal tool head support rotatably coupled to a first horizontal tool head support;
a second vertical tool head support mechanically connected to said second horizontal tool head support;
a Z-axis rotation motor positioned on top of said second horizontal tool head support having a Z-axis rotation driving gear coupled to a Z-axis rotation driven gear, and a Z-axis rotation sensor; and
a Y-axis rotation motor attached to said second vertical tool head support having a Y-axis rotation driving gear, a Y-axis rotation driven gear, and a Y-axis rotation sensor.

16. The apparatus of claim 1 wherein said tool head comprises:
a drilling tool;
a sanding tool;
a screwdriver tool, all lined up at an obtuse angle on a first plane parallel to a XZ plane of said Cartesian orthogonal coordinate system; and
a saw posited on a second plane parallel to said first plane.

17. A method for machining a workpiece according to a specification design with the computer numerical control (CNC) machining apparatus of claim 1, the method comprising:
(a) providing the computer numerical control (CNC) machining apparatus of claim 1;
(b) independently holding and releasing said workpiece using the plurality of rotatable clamps controlled by the CNC machining apparatus of claim 1;
(c) moving said workpiece linearly by independently holding, releasing, and moving said plurality of rotatable clamps numerically controlled by said CNC machining apparatus of claim 1; and (d) rotating said workpiece 360° using said plurality of rotatable clamps numerically controlled by said CNC machining apparatus of claim 1.

18. The method of claim 17 further comprising:

receiving said specification design; and translating said specification design into executable commands configured to machine patterns having coordinated locations on any side and at any length of said workpiece.

19. The method of claim 18 further comprising:

using said CNC machining apparatus of claim 1 to select a specific tool from said tool head to machine said workpiece according to said patterns.

20. The method of claim 18 further comprising:

sensing movements of said plurality of rotatable clamps; and adjusting movements according to said specification design.

\* \* \* \* \*